(12) United States Patent
Koorapaty et al.

(10) Patent No.: US 11,057,944 B2
(45) Date of Patent: Jul. 6, 2021

(54) MBMS AND PMCH IN UNLICENSED BANDS

(71) Applicant: Telefonaktiebolaget LM Ericsson (publ), Stockholm (SE)

(72) Inventors: Havish Koorapaty, Saratoga, CA (US); Jung-Fu Cheng, Fremont, CA (US); Amitav Mukherjee, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 7 days.

(21) Appl. No.: 16/308,341

(22) PCT Filed: Jun. 9, 2017

(86) PCT No.: PCT/IB2017/053431
§ 371 (c)(1),
(2) Date: Dec. 7, 2018

(87) PCT Pub. No.: WO2017/212456
PCT Pub. Date: Dec. 14, 2017

(65) Prior Publication Data
US 2019/0191456 A1 Jun. 20, 2019

Related U.S. Application Data

(60) Provisional application No. 62/348,527, filed on Jun. 10, 2016.

(51) Int. Cl.
*H04W 74/08* (2009.01)
*H04L 5/00* (2006.01)
(Continued)

(52) U.S. Cl.
CPC ......... *H04W 74/085* (2013.01); *H04L 1/1692* (2013.01); *H04L 5/005* (2013.01);
(Continued)

(58) Field of Classification Search
CPC . H04W 74/085; H04W 4/06; H04W 72/0446; H04W 74/0808; H04W 16/14;
(Continued)

(56) References Cited

U.S. PATENT DOCUMENTS 9,602,322 B2 * 3/2017 Luo .................... H04W 52/0274
9,801,147 B2 * 10/2017 Patel .................... H04W 16/14
(Continued)

FOREIGN PATENT DOCUMENTS

WO 2017044304 A1 3/2017

OTHER PUBLICATIONS

Author Unknown, "Technical Specification Group Radio Access Network; Evolved Universal Terrestrial Radio Access (E-UTRA); Physical channels and modulation (Release 13)," Technical Specification 36.211, Version 13.1.0, 3GPP Organizational Partners, Mar. 2016, 155 pages.
(Continued)

*Primary Examiner* — Wutchung Chu
(74) *Attorney, Agent, or Firm* — Withrow & Terranova, PLLC

(57) ABSTRACT

Systems and methods are disclosed that enable multi-cast transmissions (e.g., Physical Multi-cast Channel (PMCH) transmissions) on carriers in unlicensed spectrum. In some embodiments, a method of operation of a radio access node to enable multi-cast transmissions on a carrier in an unlicensed spectrum comprises performing a Listen-Before-Talk (LBT) procedure on a carrier in an unlicensed spectrum based on random backoff and a contention window size prior to a multi-cast transmission. The method further comprises transmitting the multi-cast transmission if the LBT procedure determines that the carrier in the unlicensed spectrum is Idle. In this manner, multi-cast transmissions on the carrier in the unlicensed spectrum are enabled.

12 Claims, 19 Drawing Sheets

(51) Int. Cl.
*H04L 27/00* (2006.01)
*H04L 1/16* (2006.01)
*H04W 4/06* (2009.01)
*H04W 72/04* (2009.01)
*H04W 16/14* (2009.01)

(52) U.S. Cl.
CPC ........ *H04L 5/0053* (2013.01); *H04L 27/0006* (2013.01); *H04W 4/06* (2013.01); *H04W 72/0446* (2013.01); *H04W 74/0808* (2013.01); *H04W 74/0816* (2013.01); *H04L 5/001* (2013.01); *H04W 16/14* (2013.01)

(58) Field of Classification Search
CPC ... H04L 1/1692; H04L 27/0006; H04L 5/005; H04L 5/0053; H04L 5/001
See application file for complete search history.

(56) References Cited

U.S. PATENT DOCUMENTS

| | | | | |
|---|---|---|---|---|
| 9,929,844 | B2* | 3/2018 | Damnjanovic ... | H04W 74/0816 |
| 9,986,518 | B2* | 5/2018 | Wei ................ | H04W 74/0808 |
| 10,681,527 | B2* | 6/2020 | Kim ................ | H04L 27/0006 |
| 2010/0165907 | A1 | 7/2010 | Chu et al. | |
| 2015/0296385 | A1* | 10/2015 | Zhang ............. | H04W 72/1263 370/329 |
| 2015/0312953 | A1* | 10/2015 | Wang .............. | H04L 1/00 370/312 |
| 2016/0057770 | A1* | 2/2016 | Yerramalli ....... | H04W 52/54 370/329 |
| 2016/0142192 | A1* | 5/2016 | Damnjanovic ... | H04W 74/0816 370/329 |
| 2017/0093620 | A1* | 3/2017 | Um ................. | H04L 1/1861 |
| 2017/0099667 | A1* | 4/2017 | Dinan .............. | H04L 5/0053 |
| 2017/0127424 | A1* | 5/2017 | Kherani .......... | H04W 72/08 |
| 2017/0325174 | A1* | 11/2017 | Dinan .............. | H04W 52/34 |
| 2018/0175975 | A1* | 6/2018 | Um ................. | H04L 1/1816 |
| 2018/0213386 | A1* | 7/2018 | Kim ................ | H04J 11/0086 |
| 2018/0235007 | A1* | 8/2018 | Gou ................ | H04W 16/14 |
| 2018/0317255 | A1* | 11/2018 | Um ................. | H04W 72/1268 |
| 2018/0376343 | A1* | 12/2018 | Harada ............ | H04L 5/0048 |
| 2019/0387412 | A1* | 12/2019 | Kim ................ | H04L 27/2673 |

OTHER PUBLICATIONS

Author Unknown, "Technical Specification Group Radio Access Network; Evolved Universal Terrestrial Radio Access (E-UTRA); Multiplexing and channel coding (Release 13)," Technical Specification 36.212, Version 13.1.0, 3GPP Organizational Partners, Mar. 2016, 129 pages.
Author Unknown, "Technical Specification Group Radio Access Network; Evolved Universal Terrestrial Radio Access (E-UTRA); Physical layer procedures (Release 13)," Technical Specification 36.213, Version 13.1.0, 3GPP Organizational Partners, Mar. 2016, 361 pages.
Author Unknown, "Technical Specification Group Radio Access Network; Evolved Universal Terrestrial Radio Access (E-UTRA); Medium Access Control (MAC) protocol specification (Release 13)," Technical Specification 36.321, Version 13.1.0, 3GPP Organizational Partners, Mar. 2016, 85 pages.
Brown, H., et al., "Impact of Multicast Flow for Performance of IEEE 802.11e in Wireless LAN," 2013 15th International Conference on Advanced Communications Technology (ICACT), 2013, PyeongChang, pp. 768-773.
Choi, N., et al., "Unicast-Friendly Multicast in IEEE 802.11 Wireless LANs," IEEE Consumer Communications and Networking Conference (CCNC'06), 2006, Las Vegas, NV, pp. 730-734.
Choi, S., et al., "Leader-Based Rate Adaptive Multicasting for Wireless LANs," IEEE Global Telecommunications Conference (GLOBECOM), 2007, Washington, DC, pp. 3656-3660.
Srinivas, V., "An efficient and fair reliable multicast protocol for 802.11-based wireless LANs," Graduate Theses and Dissertations, Iowa State University Digital Repository, 2009, retrieved Dec. 5, 2018, URL: https://lib.dr.iastate.edu/etd/12204, 65 pages.
International Search Report and Written Opinion for International Patent Application No. PCT/IB2017/053431, dated Nov. 14, 2017, 18 pages.
Examination Report for European Patent Application No. 17733033.9, dated Apr. 2, 2020, 5 pages.

* cited by examiner

AGGREGATED BANDWIDTH OF 100 MHz

MBMS AND PMCH IN UNLICENSED BANDS

This application is a 35 U.S.C. § 371 national phase filing of International Application No. PCT/IB2017/053431, filed Jun. 9, 2017, which claims the benefit of U.S. Provisional Application Ser. No. 62/348,527, filed Jun. 10, 2016, the disclosures of which are incorporated herein by reference in their entireties.

TECHNICAL FIELD

The present disclosure relates to broadcast operation (e.g., Multimedia Broadcast/Multi-cast Services (MBMS)) and associated transmissions (e.g., Physical Multi-cast Channel (PMCH) transmissions) on unlicensed carriers such as, e.g., unlicensed carriers in Long Term Evolution (LTE) in Unlicensed spectrum (LTE-U), New Radio (NR) access technology (NR), MulteFire, and Fifth Generation (5G) cellular communications networks.

BACKGROUND

The Third Generation Partnership Project (3GPP) Release (Rel) 13 feature "License Assisted Access" (LAA) allows Long Term Evolution (LTE) equipment to also operate in the unlicensed 5 Gigahertz (GHz) radio spectrum. The unlicensed 5 GHz spectrum is used as a complement to the licensed spectrum. The Rel-14 enhanced LAA (eLAA) work item added uplink transmissions to LAA. Accordingly, devices connect in the licensed spectrum (Primary Cell (PCell)) and use Carrier Aggregation (CA) to benefit from additional transmission capacity in the unlicensed spectrum (Secondary Cell (SCell)). Standalone operation of LTE in unlicensed spectrum is also under development by the MulteFire Alliance.

A Rel-14 work item on enhanced Multimedia Broadcast/Multi-cast Services (eMBMS) enhancements for LTE is currently under way. Some of the work item objectives include support for a standalone carrier with all downlink subframes dedicated to Multi-cast Broadcast Single Frequency Network (MBSFN) transmission and self-contained eMBMS signaling including information of System Information Blocks (SIBs) SIB13, SIB15, and SIB16. The work item will also specify means of configuring MBSFN subframes without a unicast control region and cell-specific reference signals. However, these Multimedia Broadcast/Multi-cast Services (MBMS) enhancements are targeted for licensed carriers.

Regulatory requirements may not permit transmissions in the unlicensed spectrum without prior channel sensing. Since the unlicensed spectrum must be shared with other radios of similar or dissimilar wireless technologies, a so called Listen-Before-Talk (LBT) method needs to be applied. LBT involves sensing the medium for a predefined minimum amount of time and backing off if the channel is busy. Today, the unlicensed 5 GHz spectrum is mainly used by equipment implementing the IEEE 802.11 Wireless Local Area Network (WLAN) standard. This standard is known under its marketing brand "WiFi."

LTE

LTE uses Orthogonal Frequency Division Multiplexing (OFDM) in the downlink and Discrete Fourier Transform (DFT)-spread OFDM (also referred to as single-carrier Frequency Division Multiple Access (FDMA)) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of Single Carrier FDMA (SC-FDMA) symbols in the time domain as OFDM symbols in the downlink.

In the time domain, LTE downlink transmissions are organized into radio frames of 10 milliseconds (ms), each radio frame consisting of ten equally-sized subframes of length $T_{SUBFRAME}=1$ ms, as shown in FIG. 2. Each subframe comprises two slots of duration 0.5 ms each, and the slot numbering within a frame ranges from 0 to 19. For normal Cyclic Prefix (CP), one subframe consists of 14 OFDM symbols. The duration of each symbol is approximately 71.4 microseconds (µs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3, or 4 OFDM symbols in each subframe, and the number n=1, 2, 3, or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3. The reference symbols shown there are the Cell Specific Reference Symbols (CRSs) and are used to support multiple functions including fine time and frequency synchronization and channel estimation for certain transmission modes.

Uplink transmissions are dynamically scheduled, i.e., in each downlink subframe the base station transmits control information about which terminals should transmit data to the base station in subsequent subframes, and upon which resource blocks the data is transmitted. The uplink resource grid is comprised of data and uplink control information in the Physical Uplink Shared Channel (PUSCH), uplink control information in the Physical Uplink Control Channel (PUCCH), and various reference signals such as Demodulation Reference Signals (DMRSs) and Sounding Reference Signals (SRSs). DMRSs are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 4. Note that uplink DMRS and SRS are time-multiplexed into the uplink subframe, and SRSs are always transmitted in the last symbol of a normal uplink subframe. The PUSCH DMRS is transmitted once every slot for subframes with normal CP, and is located in the fourth and eleventh SC-FDMA symbols.

From LTE Rel-11 onwards, downlink or uplink resource assignments can also be scheduled on the enhanced Physical Downlink Control Channel (EPDCCH). For Rel-8 to Rel-10 only the Physical Downlink Control Channel (PDCCH) is available. Resource grants are User Equipment device (UE) specific and are indicated by scrambling the Downlink Control Information (DCI) Cyclic Redundancy Check (CRC) with the UE-specific Cell Radio Network Temporary Identifier (C-RNTI).

CA

The LTE Rel-10 standard supports bandwidths larger than 20 Megahertz (MHz). One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular, for early LTE Rel-10 deployments, it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of CA. CA implies that an LTE Rel-10 terminal can receive multiple CCs, where the CCs have, or at least possibly have, the same structure as a Rel-8 carrier. CA is illustrated in FIG. 5. A CA-capable UE is assigned a PCell which is always activated, and one or more SCells which may be activated or deactivated dynamically.

The number of aggregated CCs as well as the bandwidth of the individual CCs may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

MBMS, Multi-Cast Traffic Channel (MTCH), Multi-Cast Control Channel (MCCH), and Physical Multi-Cast Channel (PMCH)

In LTE broadcast operation, MBMS data is transmitted simultaneously from multiple base stations that are tightly synchronized in time, using a MBSFN mode. Two new types of logical channels are introduced to support the operation: the MCCH and the MTCH for MBMS control and user data, respectively. The same broadcast data in MTCH is distributed to multiple base stations. The MBMS data is transmitted by the base stations using the PMCH.

The synchronized radio interface transmission from the cells controlled by different base stations require a SYNC-protocol support over the M1-interface between the Broadcast-Multi-cast Service Centre (BM-SC) and the base stations. As part of the SYNC-protocol procedures, the BM-SC shall include within the SYNC Protocol Data Unit (PDU) packets a time stamp which tells the timing based on which the base station sends MBMS data over the air interface. MBMS user data shall be time-stamped based on separable synchronization sequences.

The PMCH can only be transmitted in the MBSFN region of an MBSFN subframe, and uses an extended CP which leaves 12 OFDM symbols for PMCH transmission in the MBSFN subframe. The PMCH subcarrier spacing can be either 15 kilohertz (kHz) or 7.5 kHz. In Rel-13 LAA, up to eight out of ten subframes within a radio frame can be configured as MBSFN (excluding subframes 0 and 5).

The Modulation and Coding Scheme (MCS) and scheduling for the PMCH is configured by higher layer signaling, and no Hybrid Automatic Repeat Request (HARQ) is adopted. MBSFN control information is signaled using SIB13 and SIB15. The PMCH is not mapped to resource elements used for transmission of MBSFN reference signals. An example of the MBSFN Reference Symbol (RS) mapping for 15 kHz subcarrier width is shown in FIG. 6.

WLAN

In typical deployments of WLAN, Carrier Sense Multiple Access with Collision Avoidance (CSMA/CA) is used for medium access. This means that the channel is sensed to perform a Clear Channel Assessment (CCA), and a transmission is initiated only if the channel is declared as Idle. In case the channel is declared as Busy, the transmission is essentially deferred until the channel is deemed to be Idle. The duration of the channel sensing period is determined based upon a random backoff counter that is drawn from a range between zero and a Contention Window (CW), where the CW can be doubled or reset to a minimum value depending upon the failure or success of a previous transmission, respectively.

A general illustration of the LBT mechanism of WiFi is shown in FIG. 7. After a WiFi station A transmits a data frame to a station B, station B shall transmit the Acknowledgement (ACK) frame back to station A with a delay of 16 μs. Such an ACK frame is transmitted by station B without performing a LBT operation. To prevent another station interfering with such an ACK frame transmission, a station shall defer for a duration of 34 μs (referred to as Distributed Coordination Function (DCF) Inter-Frame Space (DIFS)) after the channel is observed to be occupied before assessing again whether the channel is occupied. Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

In the above basic protocol, when the medium becomes available, multiple WiFi stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW]. The default size of the random backoff CW, CWmin, is set in the IEEE specs. Note that collisions can still happen even under this random backoff protocol when there are many stations contending for the channel access. Hence, to avoid recurring collisions, the backoff CW size, CW, is doubled whenever the station detects a collision of its transmission up to a limit, CWmax, also set in the IEEE specs. When a station succeeds in a transmission without collision, it resets its random backoff CW size back to the default value CWmin.

LAA to Unlicensed Spectrum Using LTE

Up to now, the spectrum used by LTE is dedicated to LTE. This has the advantage that the LTE system does not need to care about the coexistence issue and the spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (WiFi). Operating LTE in the same manner in unlicensed spectrum as in licensed spectrum can seriously degrade the performance of WiFi as WiFi will not transmit once it detects the channel is occupied. In addition, standalone LTE in unlicensed spectrum is under development by the MulteFire Alliance where LTE operates solely in unlicensed spectrum.

Furthermore, one way to utilize the unlicensed spectrum reliably is to transmit essential control signals and channels on a licensed carrier. That is, as shown in FIG. 8, a UE is connected to a PCell in the licensed band and one or more SCells in the unlicensed band. In this application a SCell in unlicensed spectrum is denoted as an LAA SCell.

LBT in 3GPP Rel-13 LAA and MulteFire

In Rel-13 LAA, LBT for downlink data transmissions follow a random backoff procedure similar to that of WiFi, with CW adjustments based on HARQ Negative Acknowledgement (NACK) feedback. These schemes are also referred to as Category 4 LBT schemes. In these schemes a random backoff counter is drawn uniformly randomly in the interval {0, CW}, where CW is the CW. The size of the contention may be approximately doubled every time a collision on the channel is detected. Hence, this procedure is also called a binary exponential backoff. The CW size is limited by a minimum value, CWmin, and a maximum value, CWmax. The values of CWmin and CWmax may vary depending on the priority class of the traffic. For the highest priority class, the {CWmin, CWmax} values may be limited to {3, 7} where these numbers are counted in increments of one slot which has a duration of 9 μs, as shown in FIG. 7. There are four priority classes that are defined with the other three priority classes using CW size pairs of {7, 15}, {15, 63} and {15, 1023} respectively for an Access Point (AP) or an enhanced or evolved Node B (eNB). For WiFi stations or UEs in LTE, the values of {15, 63} are not used. Discovery Reference Signal (DRS) transmissions without unicast Physical Downlink Shared Channel (PDSCH) may use a single CCA duration of 25 μs.

For uplink LBT, UEs may either perform a single CCA duration of at least 25 μs (similar to downlink DRS), a random backoff procedure with a limited CW size, or no LBT if an uplink transmission burst follows a downlink transmission burst on that respective carrier (with a gap of at most 16 μs between the two bursts). MulteFire adopts the same downlink and uplink channel access mechanisms as in LAA.

SUMMARY

Systems and methods are disclosed that enable multi-cast transmissions (e.g., Physical Multi-cast Channel (PMCH) transmissions) on carriers in unlicensed spectrum. In some embodiments, a method of operation of a radio access node to enable multi-cast transmissions on a carrier in an unlicensed spectrum comprises performing a Listen-Before-Talk (LBT) procedure on a carrier in an unlicensed spectrum based on random backoff and a Contention Window (CW) size prior to a multi-cast transmission. The method further comprises transmitting the multi-cast transmission if the LBT procedure determines that the carrier in the unlicensed spectrum is Idle. In this manner, multi-cast transmissions on the carrier in the unlicensed spectrum are enabled.

In some embodiments, the CW size is a fixed CW size. Further, in some embodiments, the fixed CW size is defined based on any one or more of the fixed CW size is set to a largest possible CW size used in Category 4 LBT for downlink Physical Downlink Shared Channel (PDSCH) transmissions, the fixed CW size is set to a smallest possible CW size used in Category 4 LBT for downlink PDSCH transmissions, the fixed CW size is predefined, and the fixed CW size is determined based on one or more observed operation channel conditions.

In some embodiments, a backoff counter for the LBT procedure is set to a deterministic value.

In some embodiments, a backoff counter for the LBT procedure is determined based on reception of preambles from radio access nodes of a same or different technology.

In some embodiments, the CW size is an adaptive CW size. Further, in some embodiments, the method further comprises receiving feedback from a wireless device and configuring the adaptive CW size based on the feedback. Further, in some embodiments, the feedback comprises a number of PMCH subframes successfully decoded by the wireless device in one or more previous PMCH transmission bursts. In some embodiments, receiving the feedback comprises receiving the feedback in a portion of a last slot of a last Multi-cast Broadcast Single Frequency Network (MBSFN) subframe of a previous multi-cast transmission.

In some embodiments, the multi-cast transmission comprises one or more multi-cast transmissions, and at least one of the multi-cast transmissions is limited to a portion of a respective MBSFN subframe. Further, in some embodiments, the portion of the respective MBSFN subframe is a first slot of the MBSFN subframe. In some other embodiments, the portion of the respective MBSFN subframe is a second slot of the MBSFN subframe.

In some embodiments, the multi-cast transmission in a PMCH burst.

Embodiments of a radio access node are also disclosed. In some embodiments, a radio access node to enable multi-cast transmissions on a carrier in an unlicensed spectrum is adapted to perform a LBT procedure on a carrier in an unlicensed spectrum based on random backoff and a CW size prior to a multi-cast transmission and transmit the multi-cast transmission if the LBT procedure determines that the carrier in the unlicensed spectrum is Idle.

In some embodiments, a radio access node to enable multi-cast transmissions on a carrier in an unlicensed spectrum comprises at least one transmitter and memory storing instructions executable by the at least one processor whereby the radio access node is operable to perform a LBT procedure on a carrier in an unlicensed spectrum based on random backoff and a CW size prior to a multi-cast transmission and transmit the multi-cast transmission if the LBT procedure determines that the carrier in the unlicensed spectrum is Idle.

In some embodiments, a radio access node to enable multi-cast transmissions on a carrier in an unlicensed spectrum comprises a LBT module and a transmission module. The LBT module is operable to perform a LBT procedure on a carrier in an unlicensed spectrum based on random backoff and a CW size prior to a multi-cast transmission. The transmission module is operable to transmit the multi-cast transmission if the LBT procedure determines that the carrier in the unlicensed spectrum is Idle.

In some embodiments, a method of operation of a radio access node to enable multi-cast transmissions on a carrier in an unlicensed spectrum comprises performing a LBT procedure on a carrier in an unlicensed spectrum prior to a multi-cast transmission that is to be synchronized with multi-cast transmissions from one or more other radio access nodes and, upon completing the LBT procedure, taking an action to ensure that the multi-cast transmission from the radio access node is synchronized with the multi-cast transmissions from the one or more other radio access nodes.

In some embodiments, taking the action comprises, upon completing the LBT procedure after start of the multi-cast transmission from at least one of the one or more other radio access nodes, starting the multi-cast transmission at a point in the multi-cast transmission that is selected such that the multi-cast transmission from the radio access node is synchronized to the multi-cast transmission from the at least one of the one or more other radio access nodes. In some embodiments, the method further comprises performing a second LBT procedure in order to find another opportunity to transmit a portion of the multi-cast transmission that was not transmitted due to completing the LBT procedure after the start of the multi-cast transmission from the at least one of the one or more other radio access nodes. In some other embodiments, the radio access node does not attempt to find another opportunity to transmit a portion of the multi-cast transmission that was not transmitted due to completing the LBT procedure after the start of the multi-cast transmission from the at least one of the one or more other radio access nodes.

In some embodiments, taking the action comprises, upon completing the LBT procedure before completion of respective LBT procedures by all of the one or more other radio access nodes, deferring a start of the multi-cast transmission from the radio access node until all of the one or more other radio access nodes have completed their respective LBT procedures such that the start of the multi-cast transmission from the radio access node is synchronized to a start of the multi-cast transmissions from the one or more other radio access nodes.

In some embodiments, taking the action comprises, upon completing the LBT procedure before completion of respective LBT procedures by all of the one or more other radio access nodes, broadcasting a preamble signal with a cell Identity, ID, of the radio access node and one or more planned PMCH transmission burst parameters of the radio access node.

In some embodiments, the multi-cast transmission is a Multimedia Broadcast/Multi-cast Service (MBMS) data transmission.

In some embodiments, a radio access node to enable multi-cast transmissions on a carrier in an unlicensed spectrum is adapted to perform a LBT procedure on a carrier in an unlicensed spectrum prior to a multi-cast transmission that is to be synchronized with multi-cast transmissions from one or more other radio access nodes and, upon completing the LBT procedure, take an action to ensure that the multi-cast transmission from the radio access node is synchronized with the multi-cast transmissions from the one or more other radio access nodes.

In some embodiments, a radio access node to enable multi-cast transmissions on a carrier in an unlicensed spectrum comprises at least one transmitter, at least one processor, and memory storing instructions executable by the at least one processor whereby the radio access node is operable to perform a LBT procedure on a carrier in an unlicensed spectrum prior to a multi-cast transmission that is to be synchronized with multi-cast transmissions from one or more other radio access nodes and, upon completing the LBT procedure, take an action to ensure that the multi-cast transmission from the radio access node is synchronized with the multi-cast transmissions from the one or more other radio access nodes.

In some embodiments, a radio access node to enable multi-cast transmissions on a carrier in an unlicensed spectrum comprises a LBT module and an action taking module. The LBT module is operable to perform a LBT procedure on a carrier in an unlicensed spectrum prior to a multi-cast transmission that is to be synchronized with multi-cast transmissions from one or more other radio access nodes. The action taking module is operable to, upon completing the LBT procedure, take an action to ensure that the multi-cast transmission from the radio access node is synchronized with the multi-cast transmissions from the one or more other radio access nodes.

In some embodiments, a method of operation of a radio access node comprises transmitting a Discovery Reference Signal (DRS) including system information, on a MBSFN subframe on a carrier in an unlicensed spectrum. In some embodiments, the carrier is a standalone MBMS carrier. In some embodiments, the DRS comprises a Primary Synchronization Signal (PSS) and a Secondary Synchronization Signal (SSS).

In some embodiments, a radio access node is adapted to transmit a DRS including system information on a MBSFN subframe on a carrier in an unlicensed spectrum.

In some embodiments, a radio access node comprises at least one transmitter, at least one processor, and memory storing instructions executable by the at least one processor whereby the radio access node is operable to transmit a DRS including system information on a MBSFN subframe on a carrier in an unlicensed spectrum.

In some embodiments, a radio access node comprises a DRS transmitting module operable to transmit a DRS including system information on a MBSFN subframe on a carrier in an unlicensed spectrum.

In some embodiments, a method of operation of a radio access node to enable multi-cast transmissions on a carrier in an unlicensed spectrum comprises transmitting a plurality of PMCH bursts on a carrier in an unlicensed spectrum, wherein a PMCH burst number and a burst duration are associated with each PMCH burst of the plurality of PMCH bursts. In some embodiments, for each PMCH burst, the PMCH burst number and the burst duration for the PMCH burst are indicated at a beginning of the PMCH burst. In some embodiments, for each PMCH burst, the PMCH burst number and the burst duration for the PMCH burst are indicated at a beginning of the PMCH burst using Common Physical Downlink Control Channel (C-PDCCH) in a non-MBSFN region of a first subframe of the PMCH burst.

In some embodiments, each PMCH burst comprises a plurality of MBSFN subframes that may be time-multiplexed with non-MBSFN subframes within a transmission opportunity, and the method further comprises transmitting a control channel comprising information that indicates the locations of MBSFN subframes for the PMCH burst within the transmission opportunity.

In some embodiments, for each PMCH burst, the PMCH burst number and the burst duration for the PMCH burst are indicated in a preamble of the PMCH burst, wherein the preamble is enabled to be decoded by other radio access nodes.

In some embodiments, a radio access node to enable multi-cast transmissions on a carrier in an unlicensed spectrum is adapted to transmit a plurality of PMCH bursts on a carrier in an unlicensed spectrum, wherein a PMCH burst number and a burst duration are associated with each PMCH burst of the plurality of PMCH bursts.

In some embodiments, a radio access node to enable multi-cast transmissions on a carrier in an unlicensed spectrum comprises at least one transmitter, at least one processor, and memory storing instructions executable by the at least one processor whereby the radio access node is operable to transmit a plurality of PMCH bursts on a carrier in an unlicensed spectrum, wherein a PMCH burst number and a burst duration are associated with each PMCH burst of the plurality of PMCH bursts.

In some embodiments, a radio access node to enable multi-cast transmissions on a carrier in an unlicensed spectrum comprises a PMCH burst transmitting module operable to transmit a plurality of PMCH bursts on a carrier in an unlicensed spectrum, wherein a PMCH burst number and a burst duration are associated with each PMCH burst of the plurality of PMCH bursts.

In some embodiments, a method of operation of a radio access node to enable multi-cast transmissions in an unlicensed spectrum comprises transmitting a plurality of multi-cast transmissions on a plurality of carriers in an unlicensed spectrum based on respective LBT outcomes. In some embodiments, the plurality of multi-cast transmissions is a plurality of PMCH bursts.

In some embodiments, a radio access node to enable multi-cast transmissions in an unlicensed spectrum is adapted to transmit a plurality of multi-cast transmissions on a plurality of carriers in an unlicensed spectrum based on respective LBT outcomes.

In some embodiments, a radio access node to enable multi-cast transmissions in an unlicensed spectrum comprises at least one transmitter, at least one processor, and memory storing instructions executable by the at least one processor whereby the radio access node is operable to transmit a plurality of multi-cast transmissions on a plurality of carriers in an unlicensed spectrum based on respective LBT outcomes.

In some embodiments, a radio access node to enable multi-cast transmissions in an unlicensed spectrum comprises a transmitting module operable to transmit a plurality of multi-cast transmissions on a plurality of carriers in an unlicensed spectrum based on respective LBT outcomes.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
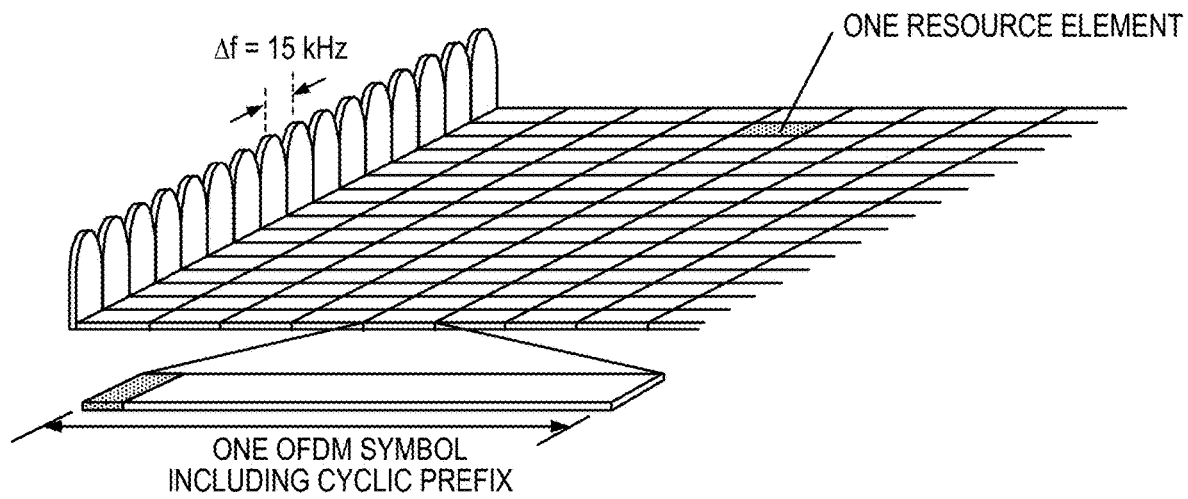
FIG. 1 illustrates the Long Term Evolution (LTE) downlink physical resource.
Figure 2:
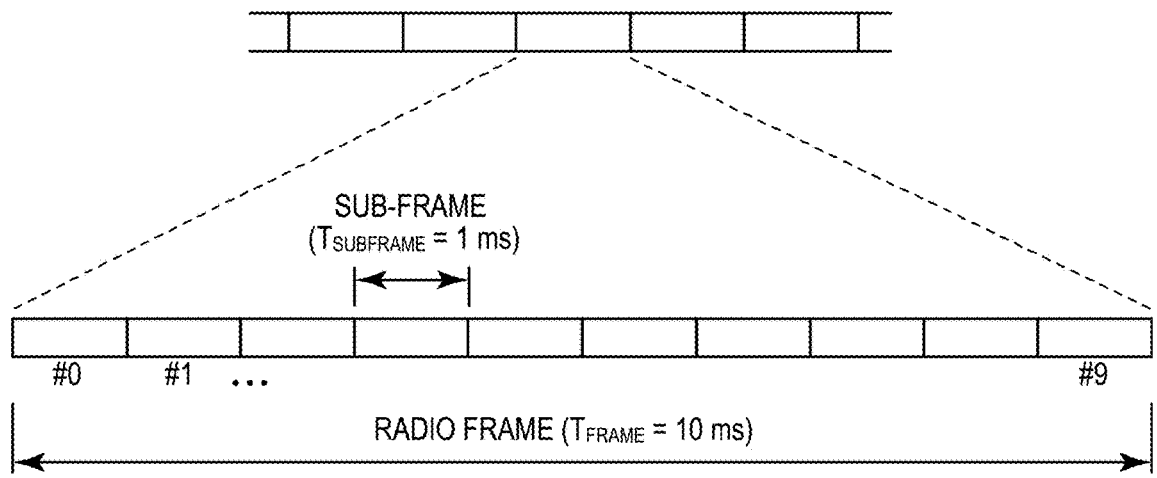
FIG. 2 illustrates the LTE time-domain structure.
Figure 3:
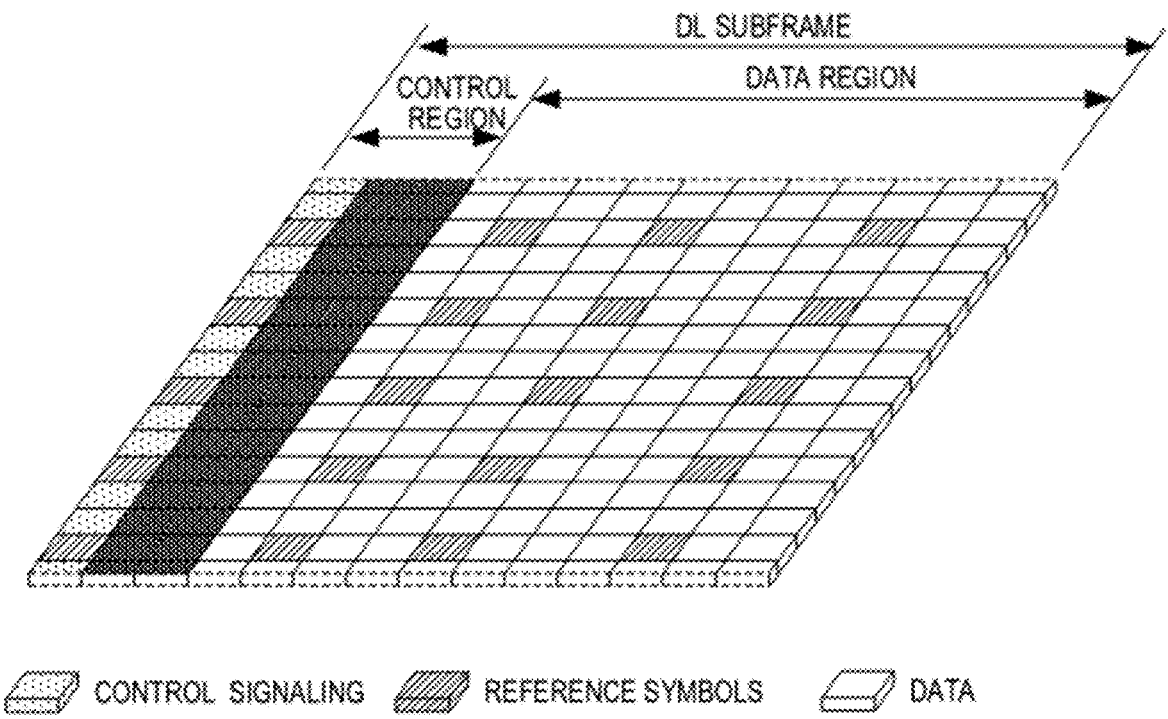
FIG. 3 illustrates an LTE downlink subframe.
Figure 4:
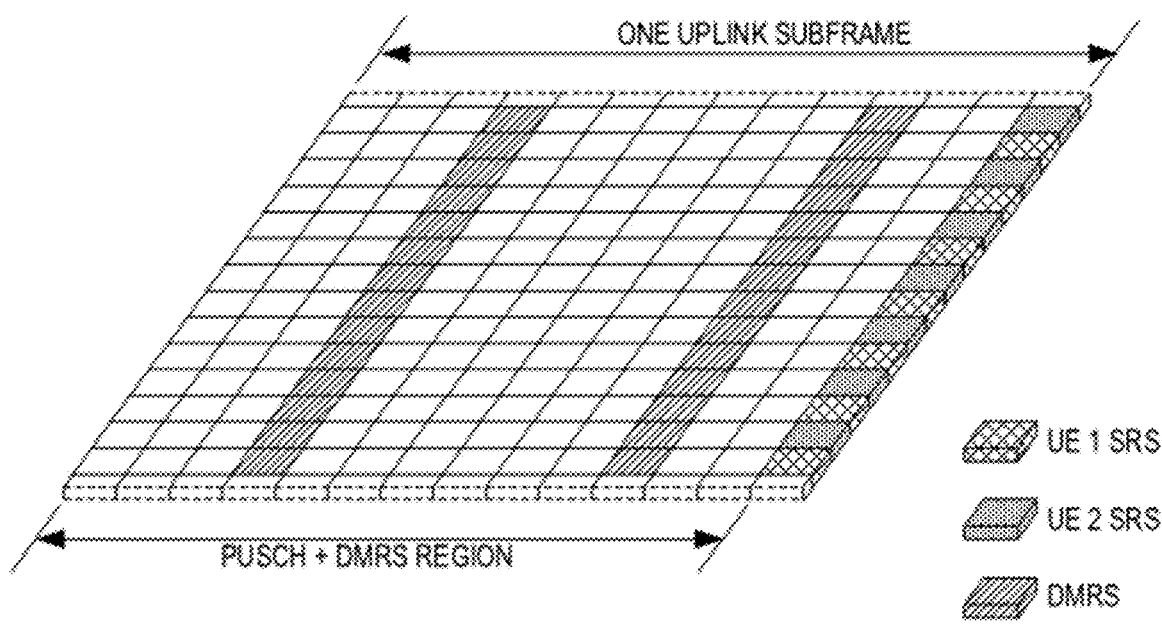
FIG. 4 illustrates an LTE Release (Rel) 12 uplink subframe.
Figure 5:
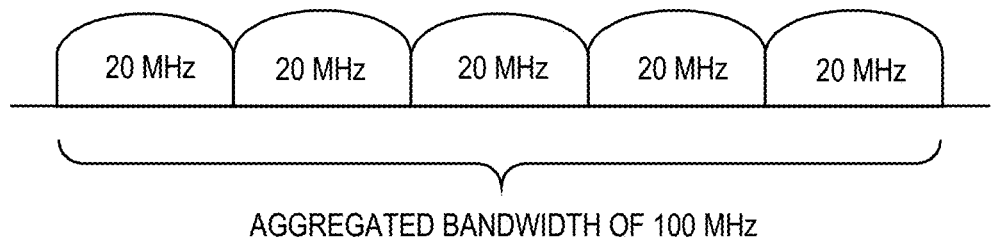
FIG. 5 illustrates Carrier Aggregation (CA)
Figure 6:
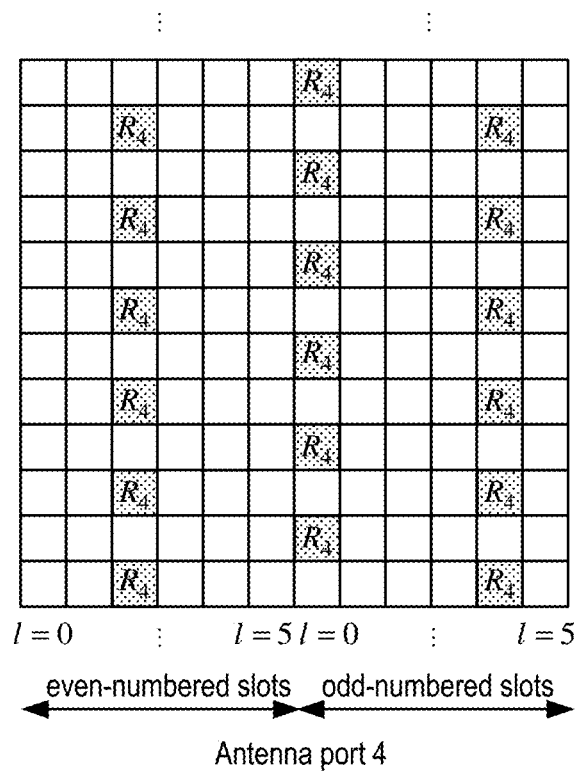
FIG. 6 illustrates Multi-cast Broadcast Single Frequency Network (MBSFN) Reference Symbols (RSs) with extended Cyclic Prefix (CP) and 15 kilohertz (kHz) subcarrier spacing.
Figure 7:
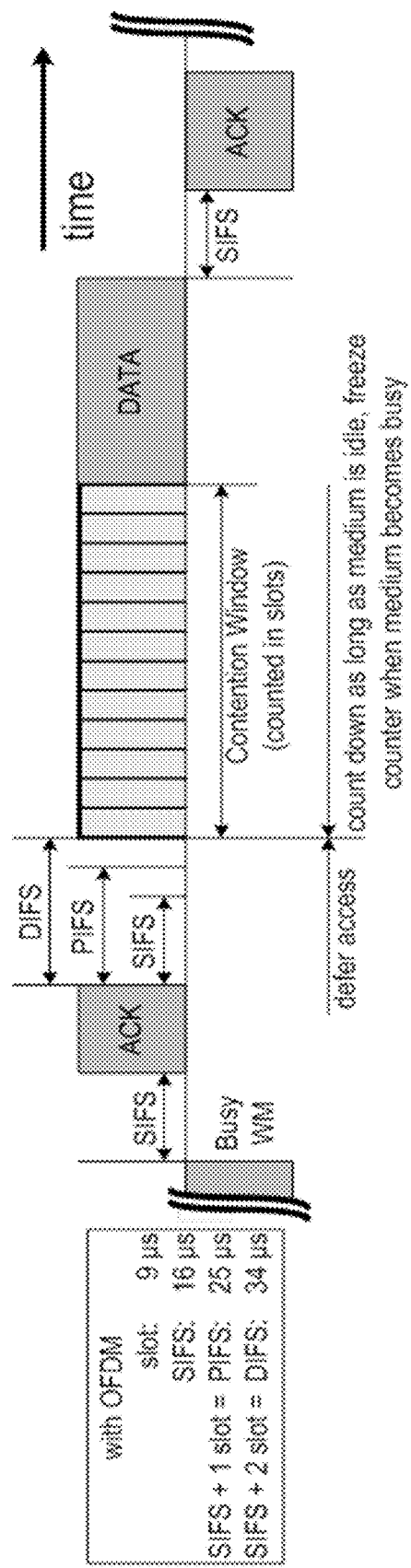
FIG. 7 illustrates Listen-Before-Talk (LBT) in WiFi.
Figure 8:
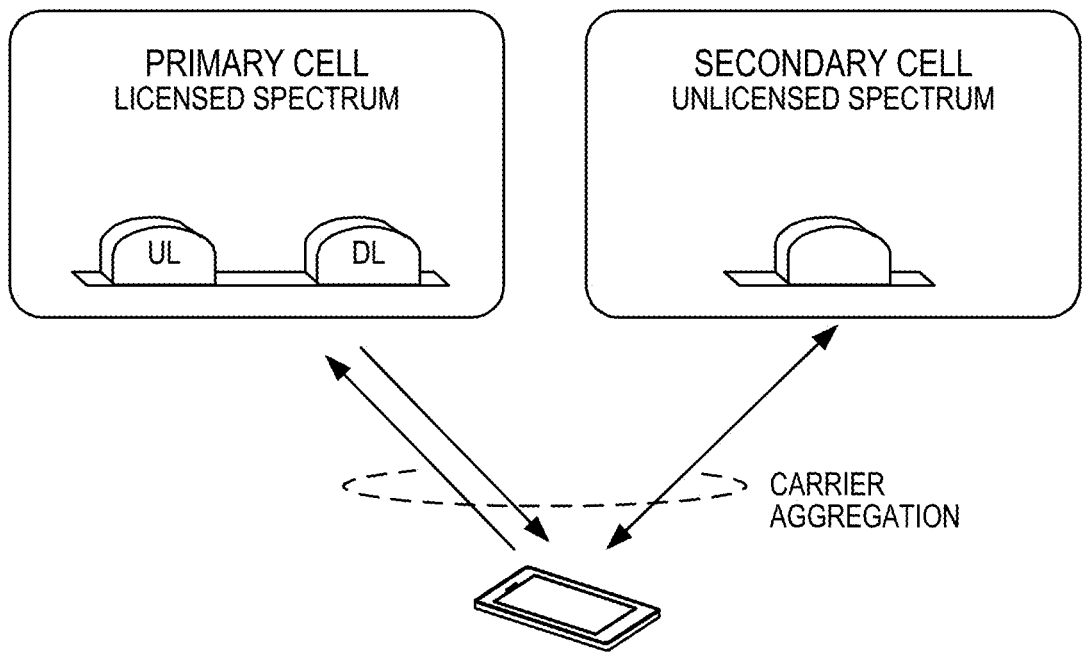
FIG. 8 illustrates License Assisted Access (LAA) to unlicensed spectrum using LTE CA.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node:

As used herein, a "radio node" is either a radio access node or a wireless device.

Radio Access Node:

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node:

As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like. Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node:

As used herein, a "network node" is any node that is either part of the radio access network or the core network of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

Physical Multi-cast Channel (PMCH) transmissions and broadcast procedures are currently not defined for carriers in unlicensed spectrum. The support of broadcast transmissions is needed to open up new use cases and addressable markets for unlicensed spectrum LTE.

Systems and methods are disclosed that enable broadcast operation (e.g., Multimedia Broadcast/Multi-cast Services (MBMS)) and associated transmissions (e.g., PMCH transmissions) on unlicensed carriers. At least some embodiments more particularly enable transmission of MBMS data via the PMCH on unlicensed carriers.

Embodiments disclosed herein provide robust broadcast transmissions for unlicensed carriers (e.g., unlicensed LTE carriers).

The following embodiments describe how to enhance PMCH transmissions on unlicensed bands. Enhanced PMCH transmitted on unlicensed carriers is referred to as ePMCH hereafter. These approaches hold for both single carrier and multi-carrier scenarios. It is to be understood that the proposed methods apply to different variations of LTE operating in unlicensed spectrum, such as License Assisted Access (LAA), LTE in unlicensed spectrum (LTE-U), New Radio (NR) access technology in unlicensed bands, and standalone LTE-U/MulteFire. The subframe lengths and number of Orthogonal Frequency Division Multiplexing (OFDM) symbols per subframe listed below are non-limiting examples, and may be scaled if the subcarrier width is scaled in NR or 5G enhancements.

Figure 9:
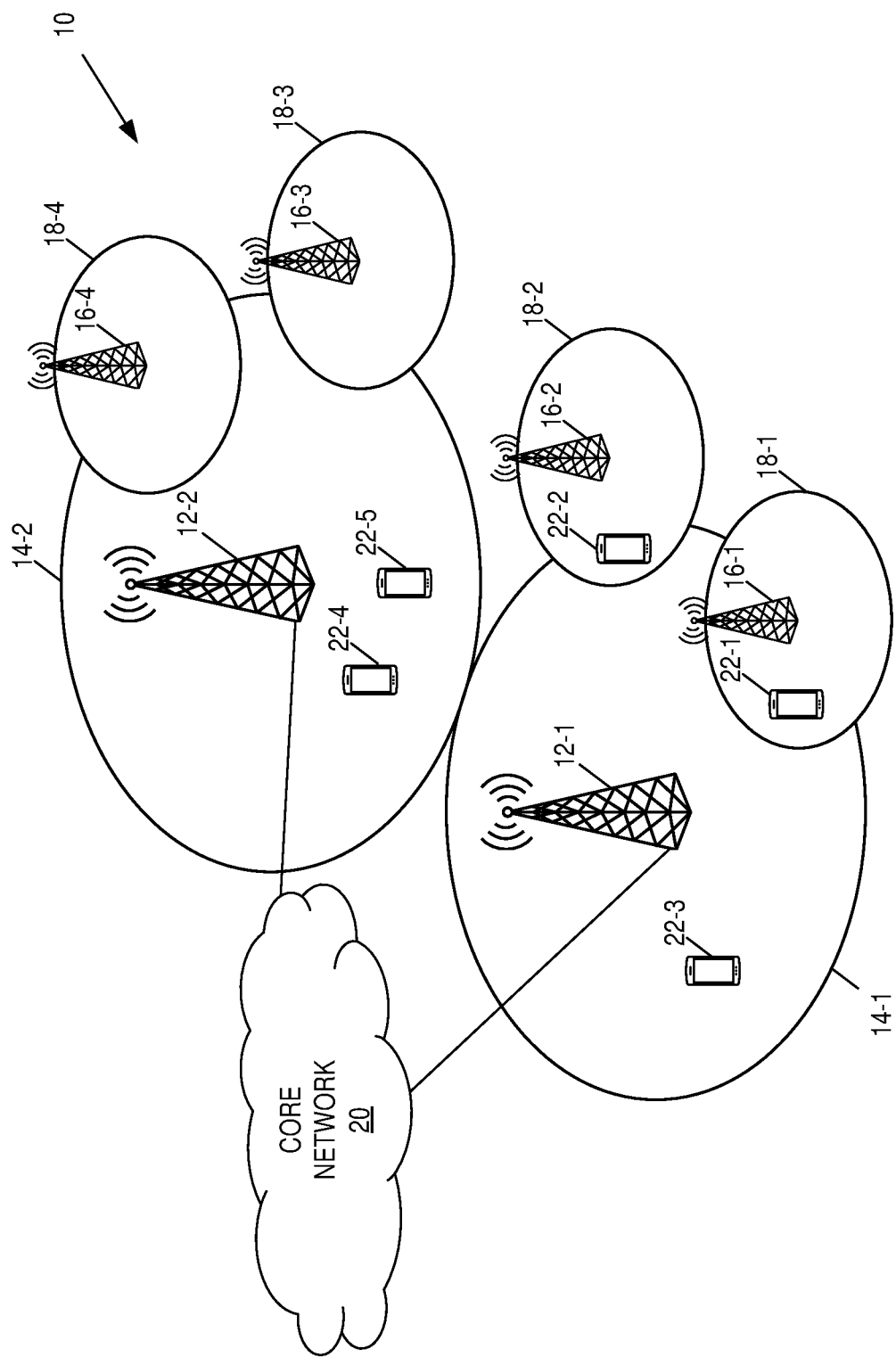
FIG. 9 illustrates one example of a cellular communications network according to some embodiments of the present disclosure.

FIG. 9 illustrates one example of a cellular communications network according to some embodiments of the present disclosure. In the embodiments described herein, the cellular communications network 10 is an LTE network in which some or all of the radio access nodes operate on a carrier(s) in an unlicensed spectrum, e.g., the 5 gigahertz (GHz) spectrum; however, the present disclosure is not limited thereto. For example, the cellular communications network 10 may implement LAA, LTE-U, MulteFire, or some other technology in which radio access nodes operate on an unlicensed carriers(s). In this example, the cellular communications network 10 includes base stations 12-1 and 12-2, which in LTE are referred to as eNBs, controlling corresponding macro cells 14-1 and 14-2. The base stations 12-1 and 12-2 are generally referred to herein collectively as base stations 12 and individually as base station 12. Likewise, the macro cells 14-1 and 14-2 are generally referred to herein collectively as macro cells 14 and individually as macro cell 14. The cellular communications network 10 also includes a number of low power nodes 16-1 through 16-4 controlling corresponding small cells 18-1 through 18-4. In LTE, the low power nodes 16-1 through 16-4 can be small base stations (such as pico or femto base stations) or Remote Radio Heads (RRHs), or the like. Notably, while not illustrated, one or more of the small cells 18-1 through 18-4 may alternatively be provided by the base stations 12. The low power nodes 16-1 through 16-4 are generally referred to herein collectively as low power nodes 16 and individually as low power node 16. Likewise, the small cells 18-1 through 18-4 are generally referred to herein collectively as small cells 18 and individually as small cell 18. The base stations 12 (and optionally the low power nodes 16) are connected to a core network 20.

The base stations 12 and the low power nodes 16 provide service to wireless devices 22-1 through 22-5 in the corresponding cells 14 and 18. The wireless devices 22-1 through 22-5 are generally referred to herein collectively as wireless devices 22 and individually as wireless device 22. In LTE, the wireless devices 22 are referred to as UEs.

In this example, the macro cells 14 are provided in either a licensed frequency spectrum (i.e., in the frequency spectrum dedicated for the cellular communications network 10), e.g., for LAA operation or an unlicensed frequency spectrum, e.g., for LAA in the unlicensed spectrum (LAA-U) or MulteFire operation. In this example, one or more (and possibly all) of the small cells 18 are provided in an unlicensed frequency spectrum (e.g., the 5 GHz frequency spectrum).

In this particular example, the base stations 12, 14 that operate on a carrier(s) in an unlicensed spectrum operate to perform Listen-Before-Talk (LBT) and transmit MBMS data according to any of the embodiments described herein. In other words, even though much of the discussion below refers to eNBs and UEs, the discussion is applicable to the base stations 12, 16 and wireless devices 22 of FIG. 9.

Figure 10:
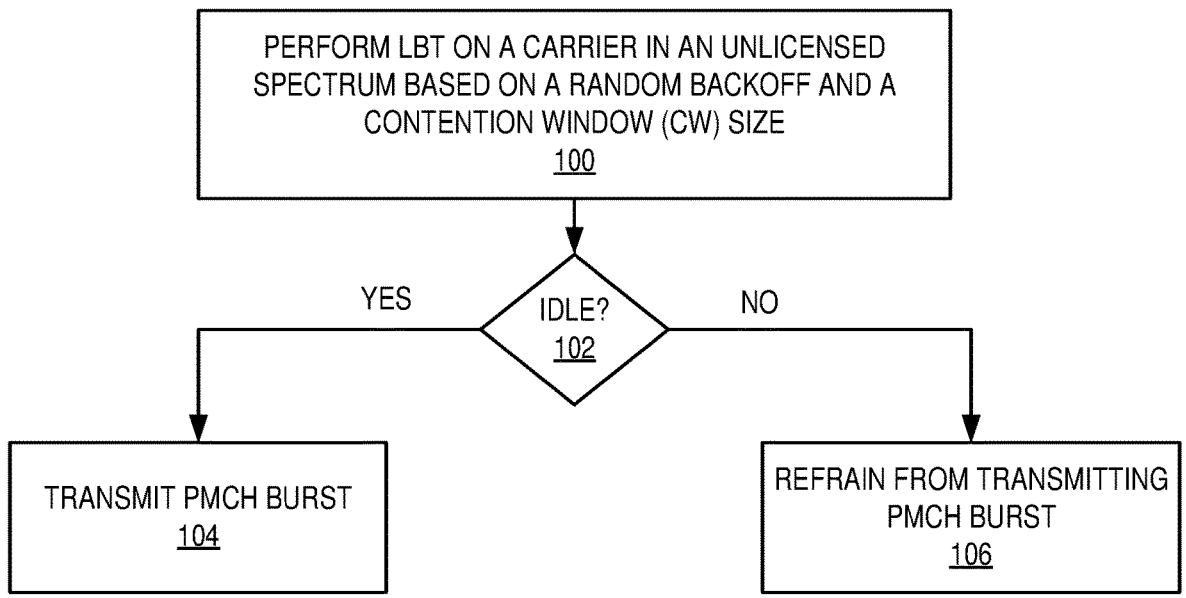
FIG. 10 illustrates an embodiment in which a radio access node performs a channel access procedure according to some embodiments of the present disclosure.

Channel Access Mechanisms for Multi-Cast Broadcast Single Frequency Network (MBSFN) Subframes The first embodiment describes channel access mechanisms based on LBT for MBSFN subframes. This is illustrated in FIG. 10, where a base station 12, 16 performs LBT on a carrier in an unlicensed spectrum based on a random backoff and a Contention Window (CW) size prior to transmission of a PMCH burst(s), i.e., a burst consisting of multiple consecutive MBSFN subframes (step 100). If a respective channel in the unlicensed spectrum is Idle (step 102, YES), the base station 12, 16 transmits the PMCH burst (step 104). Otherwise, the base station 12, 16 refrains from transmitting the PMCH burst (step 106).

In the first aspect of this embodiment, a LBT procedure based on random backoff and a fixed CW size is adopted for transmission of PMCH bursts, i.e., a burst consists of multiple consecutive MBSFN subframes. The fixed CW size may be defined based on any of the following:

The CW size is set to the largest or smallest possible CW size used in Category 4 LBT for downlink Physical Downlink Shared Channel (PDSCH) transmissions The CW size is determined by regulatory requirements The CW size is predefined by a logical entity that coordinates allocation of frequency channels, e.g., a spectrum access system The CW size is determined based on observed operation channel conditions. During non-transmission periods, the transmission nodes (i.e., the base stations 12, 16 in the example embodiment of FIG. 9) can monitor and measure the operation channel conditions. Non-limiting examples of such measurements include at least (1) the receiver signal energy level; and (2) the fractions of time with high or low received signal powers. The transmission nodes can increase or decrease the CW size based on whether the channel is observed to be heavily or lightly occupied, respectively.

It is a further feature for the transmission nodes to exchange channel condition measurements to coordinate CW size setting amongst the transmission nodes.

In a further variation of the above aspect, the backoff counter may be set to a deterministic value in order to increase the probability of simultaneous MBSFN transmission from multiple cells. In another variation, the backoff duration may be determined based on the reception of preambles from nodes of the same or another technology. In other words, the base station 12, 16 (e.g., eNB) may refrain from MBSFN transmission for a duration that is determined from the preamble field of an adjacent node's transmission.

Figure 11:
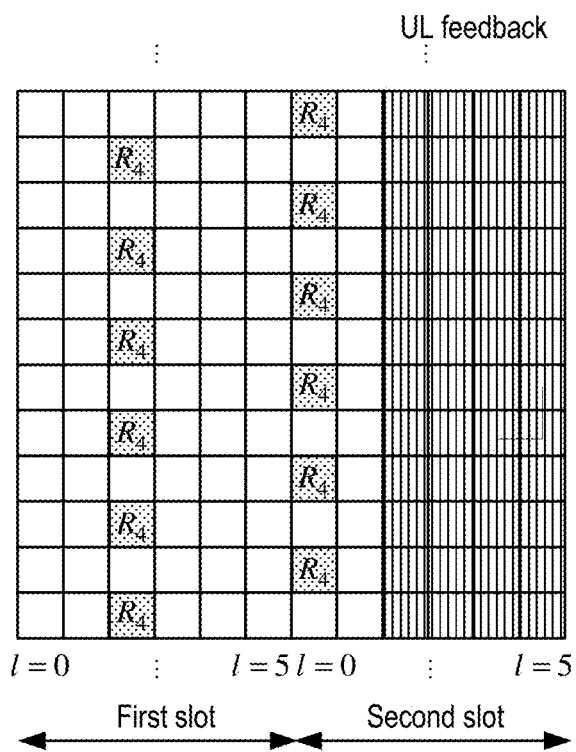
FIG. 11 illustrates uplink feedback in the second slot of a MBSFN subframe according to some embodiments of the present disclosure.

In a second aspect of the embodiment, a LBT procedure based on random backoff and an adaptive CW is adopted for transmission of PMCH bursts. Currently, no Hybrid Automatic Repeat Request (HARQ) Acknowledgement (ACK) feedback is defined for PMCH transmissions. Therefore, in this aspect, a portion of the last slot of the last MBSFN subframe of the transmit burst is dedicated for uplink transmission. The uplink transmission in PMCH burst K carries an indication regarding the number of successfully decoded PMCH subframes in one or more previous PMCH bursts K-1, K-2, . . . . An example is shown in FIG. 11, where the last four symbols of the subframe are allocated to uplink transmission. Before the start of the uplink transmission, a guard period may be allocated for downlink to uplink switching. This operation is analogous to the uplink part of the special subframe (UpPTS) region of a Time Division Duplexing (TDD) special subframe.

In the third aspect of this embodiment, partial MBSFN subframes are defined where the PMCH is limited to either the first slot or the second slot. A partial MBSFN subframe with PMCH limited to the first slot is useful when the last MBSFN subframe of a downlink burst needs to be truncated in order to adhere to regulatory restrictions on the maximum channel occupancy time. A partial MBSFN subframe with PMCH limited to the second slot is useful when a single eNB is operating multiple MBMS cells and clears LBT on one or more of these cells after the start of the subframe boundary. The base station 12, 16 (e.g., eNB) can then start transmission on these multiple cells with a partial MBSFN subframe with PMCH limited to the second slot, followed by regular MBSFN subframes. Additional dynamic scheduling information may be associated with partial MBSFN subframes in order to convey Modulation and Coding Scheme (MCS) and Transport Block Size (TBS) information.

Handling, Recovery, and Coordination for LBT Blocking

The basic property of MBSFN transmission is that all participating cells transmit exactly the same content in a synchronized manner so it appears as one transmission to the UE. However, in the unlicensed band, each eNB needs to perform independent LBT before transmission. As a result, an eNB may not succeed in transmitting all of the MBMS data at the same time as the other eNBs. Embodiments are provided for the eNB and the UE to ensure proper MBMS operations.

Figure 12:
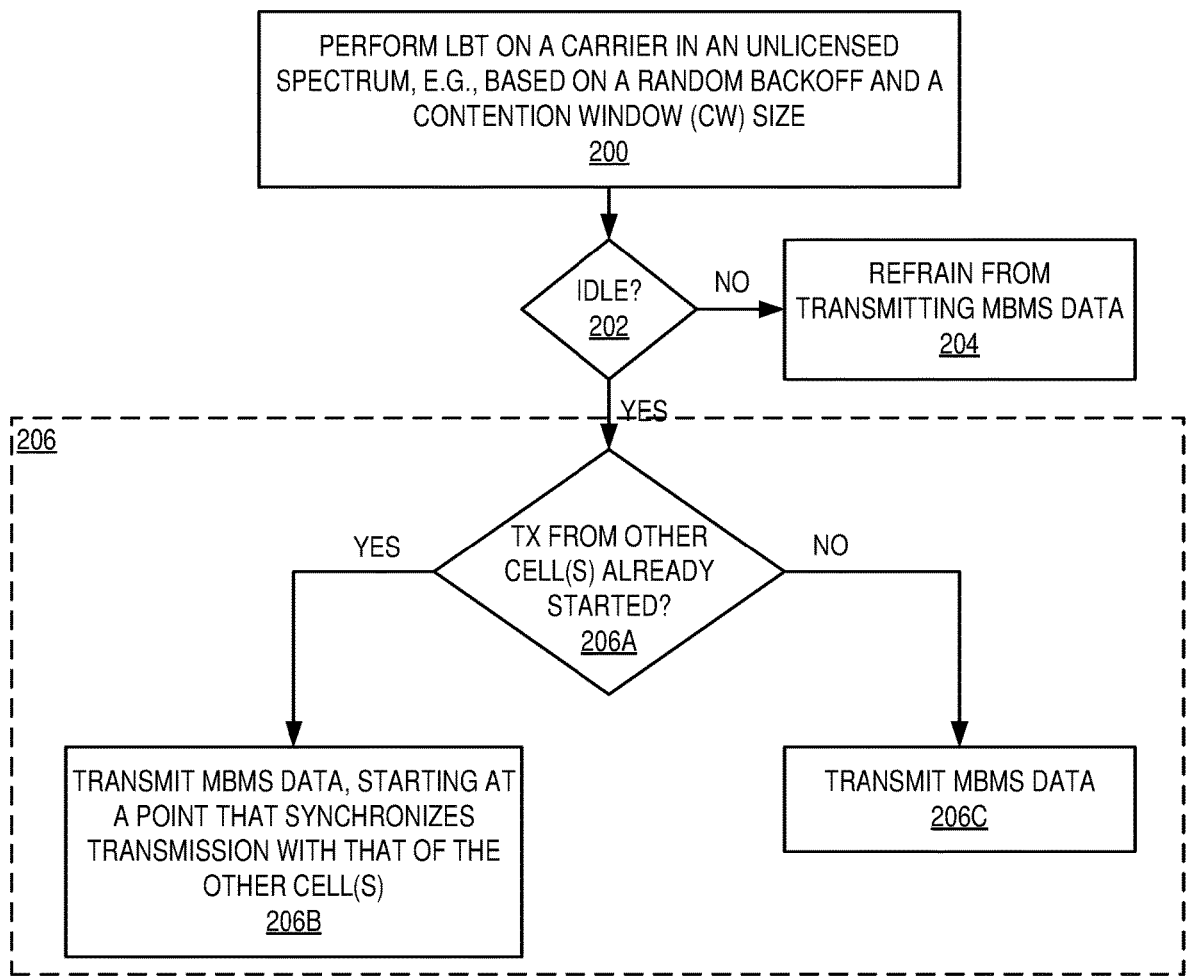
FIG. 12 is a flow chart that illustrates the operation of a radio access node according to some embodiments of the present disclosure.

In normal operation, multiple eNBs attempt to transmit the MBMS data at the same time after completing their own LBT procedures. The planned joint transmission may contain more than one subframe. In a first embodiment, if an eNB completes its LBT procedure only after the start of MBMS transmission from other eNBs, said eNB shall start transmitting MBMS data that is synchronized (and hence identical) to the MBMS data transmission from other eNBs. As an illustrating example, all eNBs attempt to transmit MBMS data for four subframes starting in subframe n. If an eNB completes its LBT procedure in subframe n+1, it shall transmit the MBMS data planned for subframes n+2 and n+3 in subframes n+2 and n+3, respectively. That is, said eNB shall not transmit MBMS data planned for subframes n and n+1 in subframes n+2 and n+3. This is illustrated in FIG. 12. As shown, the base station 12, 16 performs LBT on a carrier in an unlicensed spectrum, e.g., based on a random backoff and a CW size (as discussed above) (step 200). If a respective channel is not Idle (step 202, NO), the base station 12, 16 refrains from transmitting MBMS data (e.g., a PMCH burst, in the illustrated example) (step 204). If the respective channel is Idle (step 202, YES), the base station 12, 16 takes an action(s) to ensure that the MBMS data transmission from the radio access node is synchronized with the MBMS data transmissions from the one or more other base stations 12, 16 (step 206). Specifically, in this example, the base station 12, 16 determines whether transmission of the MBMS data from another cell(s) has already started (step 206A). If so, the base station 12, 16 transmits the MBMS data, starting at a point that synchronizes the transmission of the MBMS data with that of the other cell(s) (step 206B). Returning to step 206A, if transmission of the MBMS data has not already started from other cell(s), the base station 12, 16 transmits the MBMS data (step 206C).

In a second embodiment, an eNB with MBMS data that has not been transmitted due to LBT blocking can continue to perform LBT in order to find another opportunity to transmit the remaining MBMS data.

It is one feature of the embodiment that said eNB performs LBT and attempts to transmit the remaining MBMS data for a limited duration. Said limited duration is set or adapted considering at least (1) the planned arrival time of the next MBMS data batch; (2)

the expiration time stamp of the remaining data batch; and (3) the arrival of the next MBMS data batch.

It is another feature of the embodiment that said eNB can signal to other eNBs that it has remaining MBMS data. Said other eNBs may select less aggressive channel access parameters or procedures for their channel access for a limited duration.

Some UEs may receive the same MBMS data at two different times. UEs can detect duplicated data based on the Multi-cast Control Channel (MCCH) Protocol Data Unit (PDU) sequence number. Duplicated MBMS data does not need to be passed to higher protocol layers or applications.

Figure 13:
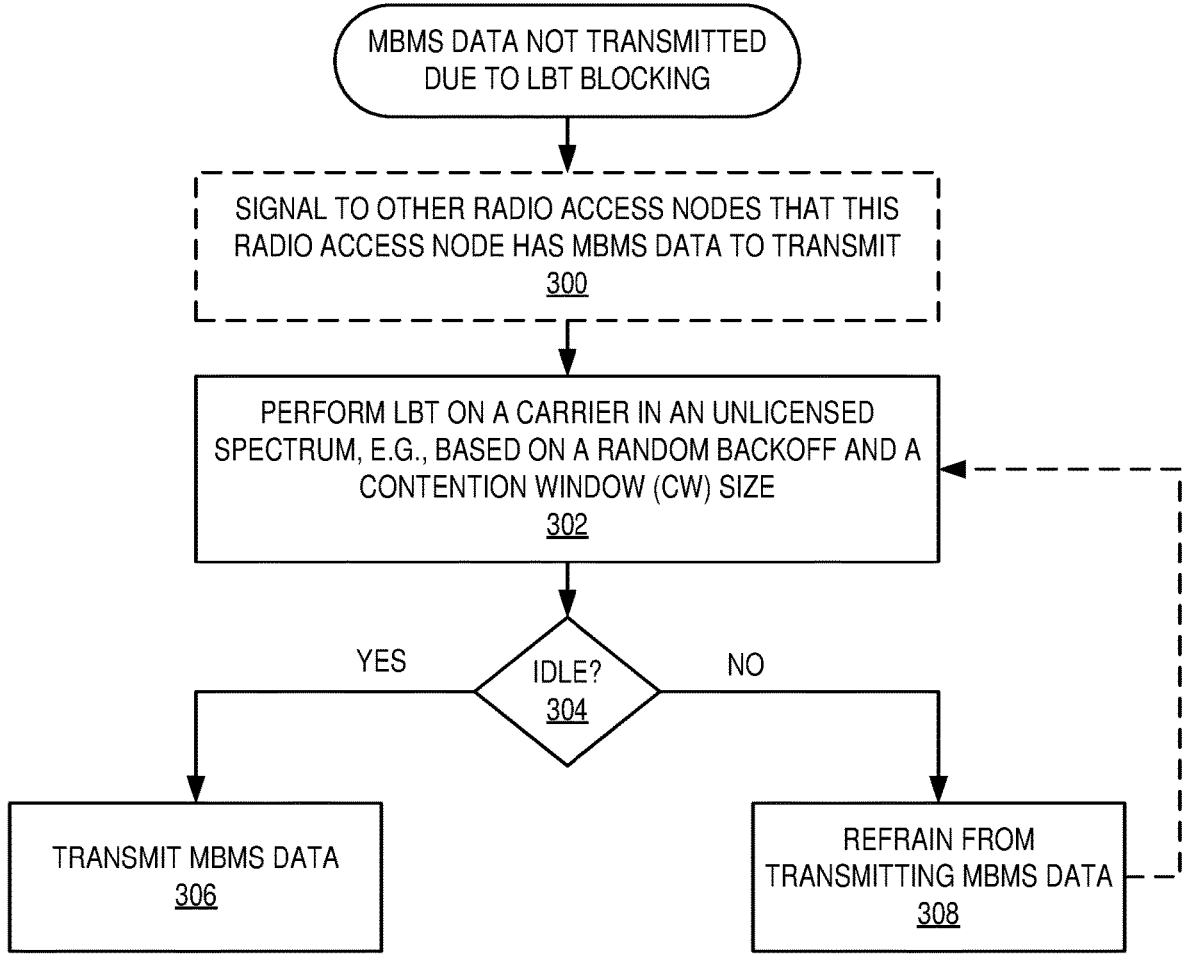
FIG. 13 is a flow chart that illustrates the operation of a radio access node according to some embodiments of the present disclosure.
Figure 14:
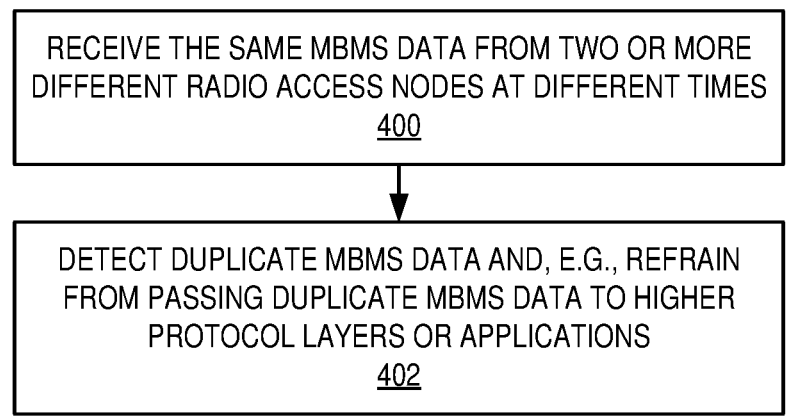
FIG. 14 illustrates the operation of a wireless device where the wireless device receives the same MBMS data from two or more different radio access nodes at different times in accordance with some embodiments of the present disclosure.

At least some of these aspects are illustrated in FIGS. 13 and 14. As illustrated in FIG. 13, a base station 12, 16 has MBMS data that was not transmitted due to LBT blocking (e.g., not transmitted due to starting transmission of MBMS data starting at, e.g., subframe n+2 when other cell(s) have already started transmission when the base station 12, 16 completes LBT). In some embodiments (i.e., optionally), the base station 12, 16 signals other base stations (i.e., other radio access nodes) that the base station 12, 16 has MBMS data to transmit (step 300). The base station 12, 16 performs LBT on a carrier in the unlicensed spectrum e.g., as discussed above (step 302). If a respective channel is Idle (step 304, YES), the base station 12, 16 transmits the MBMS data that was previously blocked due to LBT (step 306). Otherwise, the base station 12, 16 refrains from transmitting the MBMS data and, optionally, continues to attempt to transmit the MBMS data for a limited duration of time (step 308). LBT may be repeated for a limited duration. FIG. 14 illustrates the operation of a wireless device 22 where the wireless device 22 receives the same MBMS data from two or more different base stations 12, 16 at different times (step 400). The wireless device 22 detects the duplicate MBMS data and, e.g., refrains from passing duplicate MBMS data to higher protocol layers or applications, as described above (step 402).

In a third embodiment, an eNB with MBMS data that has not been transmitted due to LBT blocking will not attempt to transmit the remaining MBMS data. To ensure service quality, the MBMS data shall be encoded with more redundancy using the LTE MBMS Forward Error Correction (FEC) such that the UE can recover from such erasure events. Said eNB may further signal to the Broadcast-Multicast Service Centre (BM-SC) of its LBT blocking events. The BM-SC can aggregate the LBT blocking event reports in the MBMS area to determine and adapt the outer FEC redundancy level.

Figure 15:
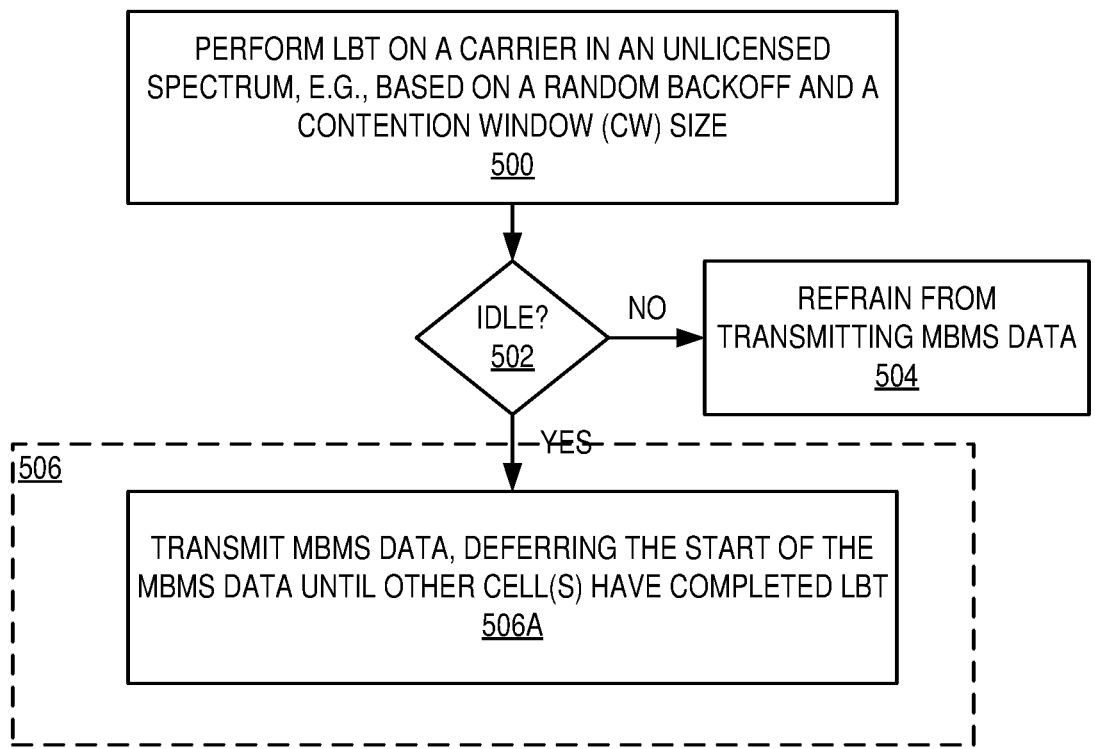
FIG. 15 is a flow chart that illustrates the operation of a radio access node according to some embodiments of the present disclosure.

In another aspect of the above embodiments, to ensure coordinated MBSFN transmission between adjacent eNBs, an eNB that clears LBT may self-defer its transmission until neighboring eNBs complete their LBT procedures. This is illustrated in FIG. 15 where the base station 12, 16 performs LBT (step 500). If a respective channel in the unlicensed spectrum is not Idle (step 502, NO), the base station 12, 16 refrains from transmitting the MBMS data (step 504). However, if the channel is Idle (step 502, YES), the base station 12, 16 takes an action to ensure that its transmission of the MBMS data is synchronized to that of one or more other cells (step 506). Specifically, in this embodiment, the base station 12, 16 transmits the MBMS data (e.g., in the form of a PMCH burst), deferring the start of the transmission until the other cell(s) have completed LBT (step 506A).

Figure 16:
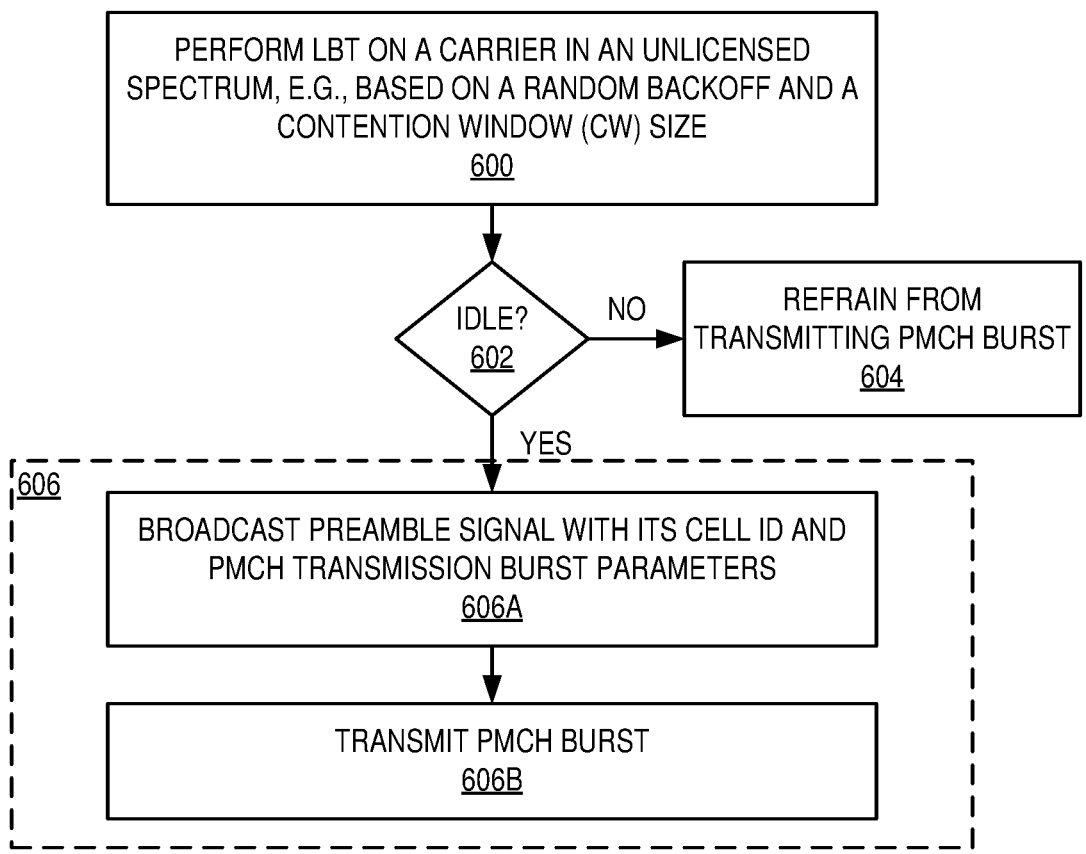
FIG. 16 is a flow chart that illustrates the operation of a radio access node according to some embodiments of the present disclosure.

Alternately, an eNB that clears LBT may broadcast a preamble signal with its cell Identity (ID) and planned PMCH transmission burst parameters, such that neighboring eNBs that intend to serve the same MBSFN data can coordinate their transmissions. This is illustrated in FIG. 16 where the base station 12, 16 performs LBT (step 600). If a respective channel in the unlicensed spectrum is not Idle (step 602, NO), the base station 12, 16 refrains from transmitting the MBMS data (step 604). However, if the channel is Idle (step 602, YES), the base station 12, 16 takes an action to ensure that its transmission of the MBMS data is synchronized to that of one or more other cells (step 606). Specifically, in this embodiment, the base station 12, 16 broadcasts a preamble signal with its cell ID and planned PMCH transmission burst parameters, as discussed above, (step 606A) and transmits the MBMS data (e.g., in the form of a PMCH burst) according to the planned PMCH transmission burst parameters (step 606B).

DRS Transmission on MBSFN Subframes

Standalone eMBMS carriers may not contain any control region, with the consequence that periodic DRS transmissions in non-MBSFN subframes are required to indicate control information to UEs receiving PMCH. On the other hand, a fixed periodicity for DRS transmissions cannot be guaranteed on unlicensed carriers due to LBT and uncertainty in obtaining channel access.

Figure 17:
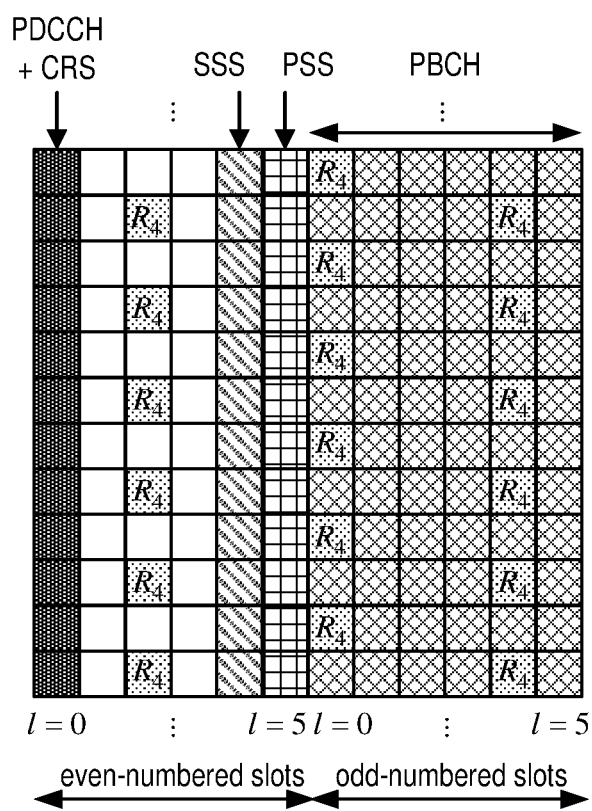
FIG. 17 illustrates a Discovery Reference Signal (DRS) and System Information (SI) transmission on the central six Physical Resource Blocks (PRBs) of a MBSFN subframe with a MBSFN RS according to some embodiments of the present disclosure.

Therefore, in some embodiments, the transmission of DRS, including System Information (SI), on a MBSFN subframe is provided. A non-limiting example is shown in FIG. 17. In this example, the first OFDM symbol contains Physical Control Format Indicator Channel (PCFICH) and Physical Downlink Control Channel (PDCCH) together with Cell Specific Reference Symbol (CRS). The PDCCH and PCFICH may be absent if no control signaling is needed for unicast data or SI Block (SIB) scheduling. In the center six Physical Resource Blocks (PRBs), the penultimate and last symbols of the first slot contain Secondary Synchronization Signal (SSS) and Primary Synchronization Signal (PSS), respectively. The Physical Broadcast Channel (PBCH) is mapped to the six symbols of the second slot in the center six PRBs, which is similar to the length of the enhanced PBCH (ePBCH) in MulteFire. The PBCH may be rate matched around the MBSFN Reference Symbol (RS). In another design, additional SSS and PSS sequences may be mapped in symbols 1 and 3 of the first slot.

Additional SIB information may also be present in the above example. For example, scheduling information for SIBs associated with MBMS parameters, such as SIB13, SIB15, and SIB16, may be indicated. Alternatively, these SIBs or some portion thereof may be included in the subframe in the non-MBSFN region.

The LBT for such MBSFN subframes with DRS may follow either the same rules as DRS in LAA or may be based on the procedures provided in the previous embodiment.

Figure 18:
FIG. 18 is a flow chart that illustrates the operation of a radio access node and a wireless device according to some embodiments of the present disclosure.

Transmission of DRS and SI in a MBSFN subframe in accordance with at least some of the embodiments above is illustrated in FIG. 18. As illustrated, the base station 12, 16 transmits DRS and SI in a MBSFN subframe (step 700). The wireless device 22 receives and uses the DRS and SI (step 702).

Common Control Signaling for MBSFN Subframes

Discontinuous downlink transmissions on the unlicensed carriers due to LBT failure or limits on maximum channel occupancy durations can lead to ambiguity at UEs regarding whether a particular MBSFN subframe was actually transmitted or not.

In the first aspect of this fourth embodiment, a PMCH burst number and burst duration is associated with every PMCH burst transmitted by the System Frame Number (SFN) network. The burst number and duration may be indicated at the beginning of every PMCH burst using Common PDCCH (C-PDCCH) in the non-MBSFN region of the first subframe. UEs that determine that they have missed the reception of one or more PMCH transmissions may report this to the serving cell. The C-PDCCH may also carry an indication regarding the location and length of partial MBSFN subframes within a burst, where partial MBSFN subframes are defined in the first embodiment of the section entitled "Channel Access Mechanisms for MBSFN Subframes" above.

In another aspect of this embodiment, MBSFN subframes may be time-multiplexed with non-MBSFN subframes carrying downlink or uplink data within a Transmission Opportunity (TXOP) or burst. In this case, the C-PDCCH may carry information regarding the location of PMCH subframes within the TXOP. UEs that are configured to receive PMCH can then ignore non-MBSFN subframes for improved power consumption.

In another aspect of this embodiment, the PMCH burst numbering and burst duration may be indicated in a preamble that is designed to be decoded at neighboring eNBs in order to facilitate coordination.

Figure 19:
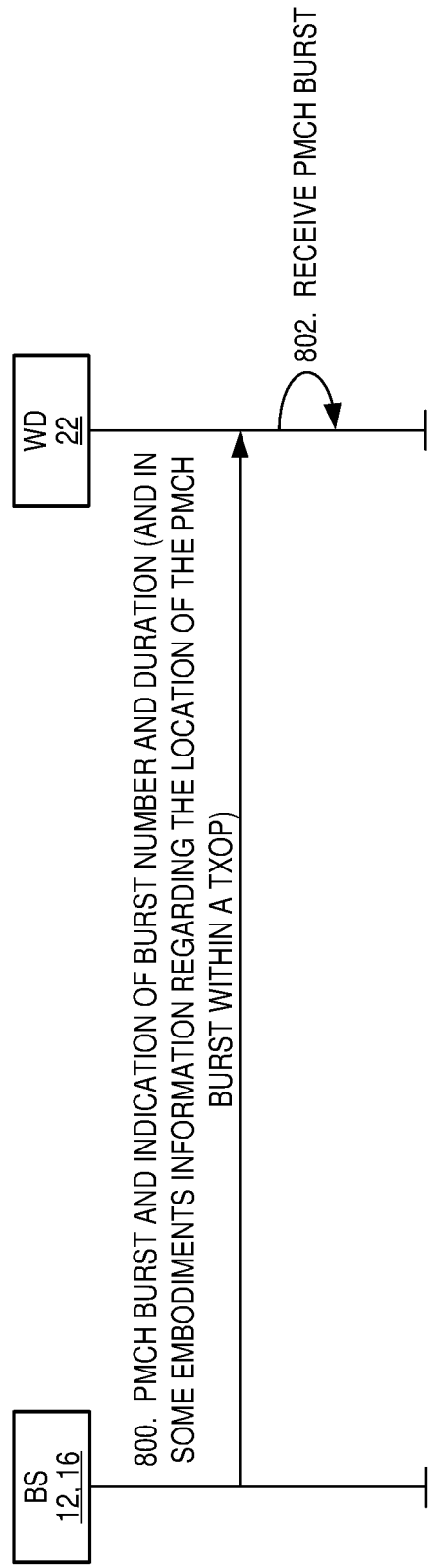
FIG. 19 is a flow chart that illustrates the operation of a radio access node and a wireless device according to some embodiments of the present disclosure.

These aspects are illustrated in FIG. 19. As illustrated, the base station 12, 16 transmits a PMCH burst and an indication of the burst number and duration of the PMCH burst (step 800). As discussed above, the indication of the burst number and duration may be included in a control channel. In addition, in some embodiments, the MBSFN subframes of the PMCH burst may be time-multiplexed with non-MBSFN subframes, where the base station 12, 16 also transmits an indication of the location of the MBSFN subframes (i.e., the PMCH subframes) in the TXOP, as discussed above. In some embodiments, the indication of the burst number and duration may be indicated in a preamble transmitted by the base station 12, 16. The wireless device 22 receives the PMCH burst (step 802).

Multicarrier Transmission of PMCH Based on LBT Outcomes

Figure 20:
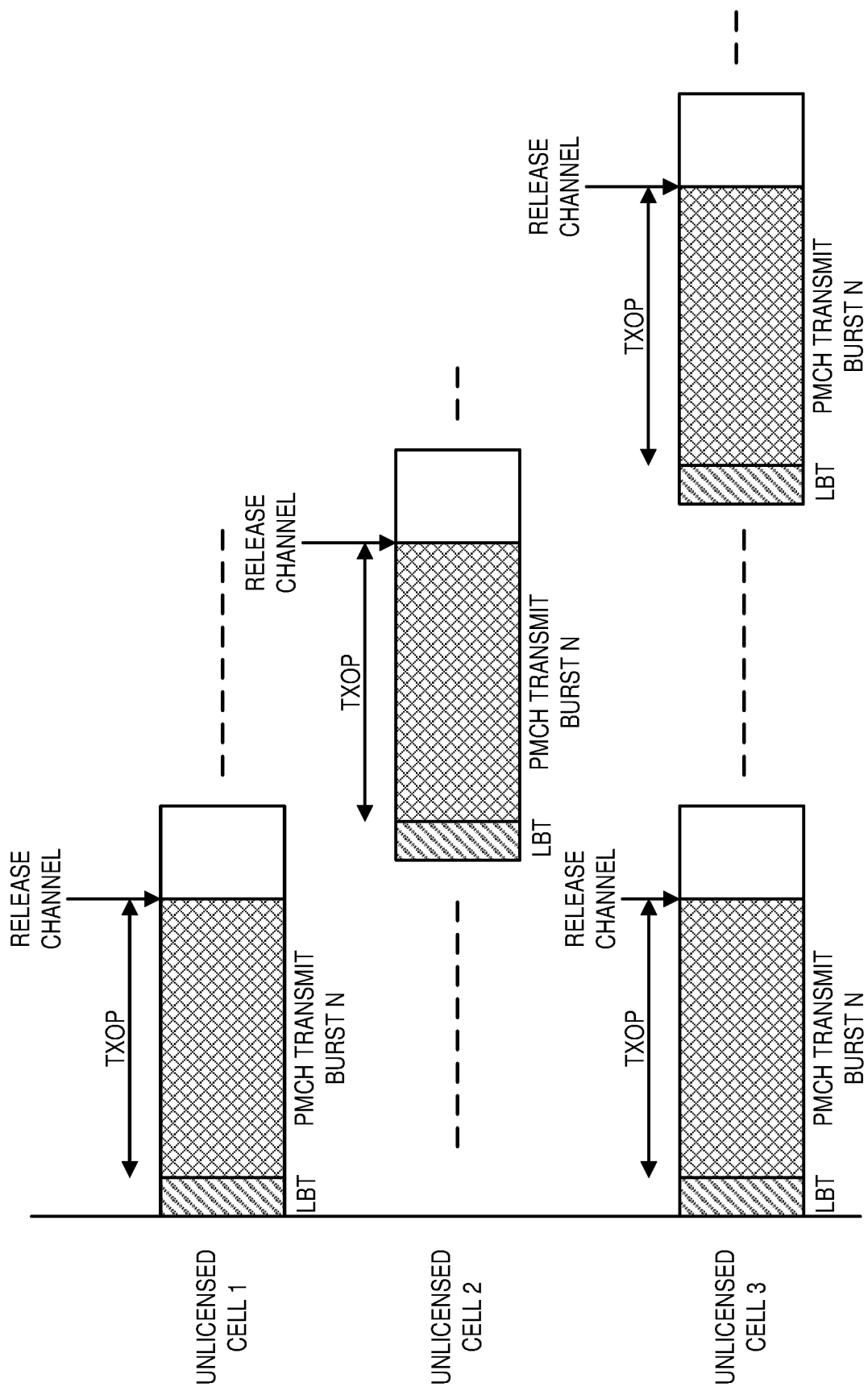
FIG. 20 illustrates downlink subframe puncturing to provide an uplink LBT opportunity prior to the end of a downlink burst according to some embodiments of the present disclosure.

In the fifth embodiment, different PMCH bursts are transmitted on different unlicensed Component Carriers (CCs) based on the corresponding LBT outcomes, as shown in FIG. 20. These CCs may be co-located at the same eNB or non-co-located with a backhaul connection between them. A similar operation may be applied for a dual connectivity scenario with non-ideal backhaul between a master eNB and a secondary eNB.

Combination of Embodiments

Many embodiments are described herein. Unless otherwise indicated or required, any of the embodiments described herein may be combined (i.e., used together with) any of the other embodiments described herein.

Example Radio Access Node and Wireless Device Embodiments

Figure 21:
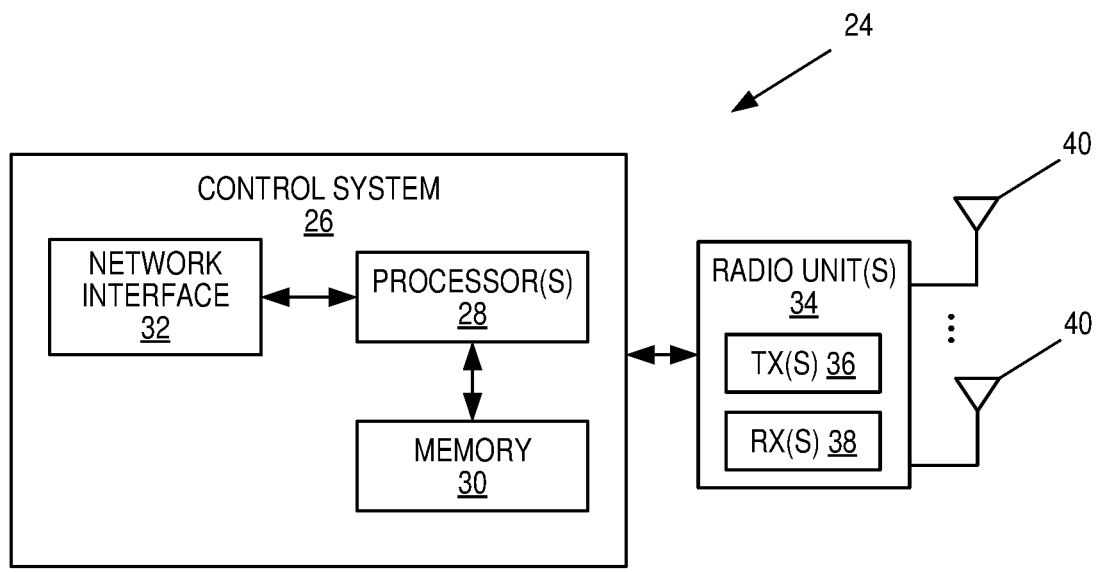
FIGS. 21 to 23 are block diagrams of various embodiments of a radio access node.

FIG. 21 is a schematic block diagram of a radio access node 24 according to some embodiments of the present disclosure. The radio access node 24 may be, for example, a base station 12, 16. As illustrated, the radio access node 24 includes a control system 26 that includes one or more processors 28 (e.g., Central Processing Units (CPUs), Application Specific Application Specific Integrated Circuits (ASICs), Field Programmable Gate Arrays (FPGAs), and/or the like), memory 30, and a network interface 32. In addition, the radio access node 24 includes one or more radio units 34 that each includes one or more transmitters 36 and one or more receivers 38 coupled to one or more antennas 40. In some embodiments, the radio unit(s) 34 is external to the control system 26 and connected to the control system 26 via, e.g., a wired connection (e.g., an optical cable). However, in some other embodiments, the radio unit(s) 34 and potentially the antenna(s) 40 are integrated together with the control system 26. The one or more processors 28 operate to provide one or more functions of a radio access node 24 as described herein. In some embodiments, the function(s) are implemented in software that is stored, e.g., in the memory 30 and executed by the one or more processors 28.

Figure 22:
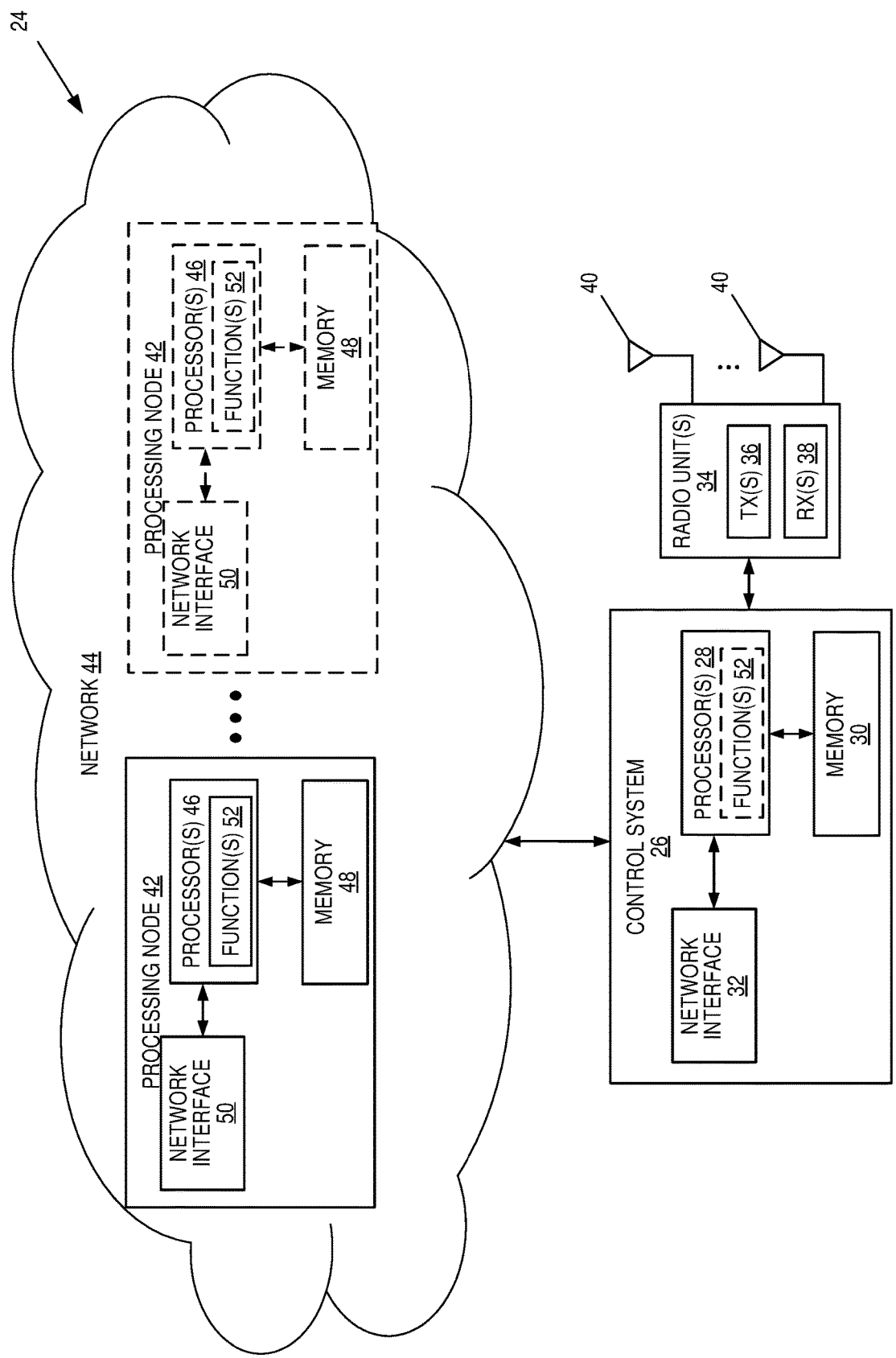

FIG. 22 is a schematic block diagram that illustrates a virtualized embodiment of the radio access node 24 according to some embodiments of the present disclosure. This discussion is equally applicable to other types of network nodes. Further, other types of network nodes may have similar virtualized architectures.

As used herein, a "virtualized" radio access node is an implementation of the radio access node 24 in which at least a portion of the functionality of the radio access node 24 is implemented as a virtual component(s) (e.g., via a virtual machine(s) executing on a physical processing node(s) in a network(s)). As illustrated, in this example, the radio access node 24 includes the control system 26 that includes the one or more processors 28 (e.g., CPUs, ASICs, FPGAs, and/or the like), the memory 30, and the network interface 32 and the one or more radio units 34 that each includes the one or more transmitters 36 and the one or more receivers 38 coupled to the one or more antennas 40, as described above. The control system 26 is connected to the radio unit(s) 34 via, for example, an optical cable or the like. The control system 26 is connected to one or more processing nodes 42 coupled to or included as part of a network(s) 44 via the network interface 32. Each processing node 42 includes one or more processors 46 (e.g., CPUs, ASICs, FPGAs, and/or the like), memory 48, and a network interface 50.

In this example, functions 52 of the radio access node 24 described herein are implemented at the one or more processing nodes 42 or distributed across the control system 26 and the one or more processing nodes 42 in any desired manner. In some particular embodiments, some or all of the functions 52 of the radio access node 24 described herein are implemented as virtual components executed by one or more virtual machines implemented in a virtual environment(s) hosted by the processing node(s) 42. As will be appreciated by one of ordinary skill in the art, additional signaling or communication between the processing node(s) 42 and the control system 26 is used in order to carry out at least some of the desired functions 52. Notably, in some embodiments, the control system 26 may not be included, in which case the radio unit(s) 34 communicates directly with the processing node(s) 42 via an appropriate network interface(s).

In some embodiments, a computer program including instructions which, when executed by at least one processor, causes the at least one processor to carry out the functionality of radio access node 24 or a node (e.g., a processing node 42) implementing one or more of the functions 52 of the radio access node 24 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 23:
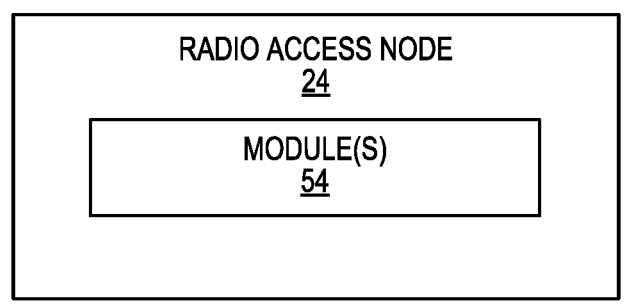

FIG. 23 is a schematic block diagram of the radio access node 24 according to some other embodiments of the present disclosure. The radio access node 24 includes one or more modules 54, each of which is implemented in software. The module(s) 54 provide the functionality of the radio access node 24 described herein. This discussion is equally applicable to the processing node 42 of FIG. 22 where the modules 54 may be implemented at one of the processing nodes 42 or distributed across multiple processing nodes 42 and/or distributed across the processing node(s) 42 and the control system 26.

Figure 24:
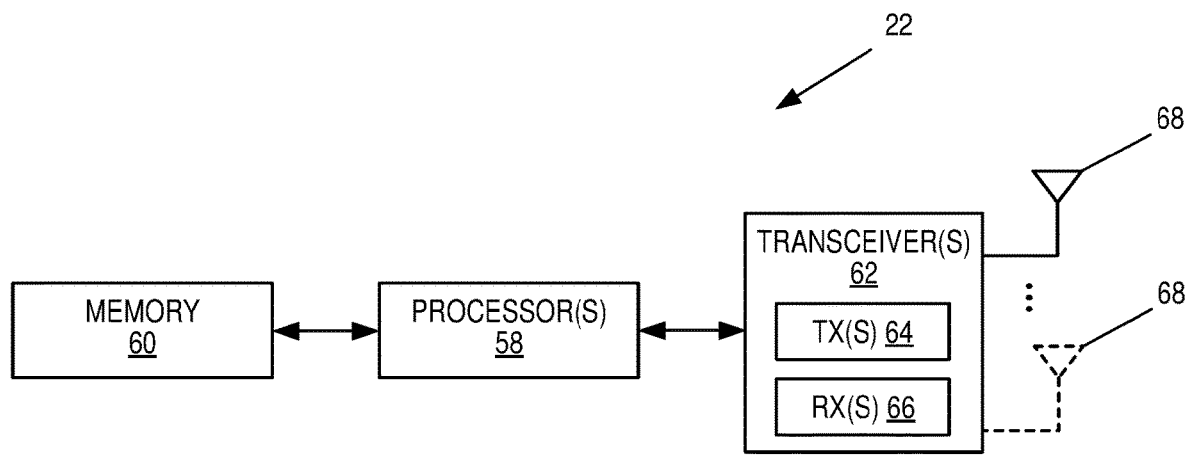
FIGS. 24 and 25 are block diagrams of various embodiments of a wireless device.

FIG. 24 is a schematic block diagram of a wireless device 22 (e.g., UE) according to some embodiments of the present disclosure. As illustrated, the wireless device 22 includes one or more processors 58 (e.g., CPUs, ASICs, FPGAs, and/or the like), memory 60, and one or more transceivers 62 each including one or more transmitters 64 and one or more receivers 66 coupled to one or more antennas 68. In some embodiments, the functionality of the wireless device 22 (e.g., UE) described above may be fully or partially implemented in software that is, e.g., stored in the memory 60 and executed by the processor(s) 58.

In some embodiments, a computer program including instructions which, when executed by at least one processor, causes the at least one processor to carry out the functionality of the UE 56 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 25:
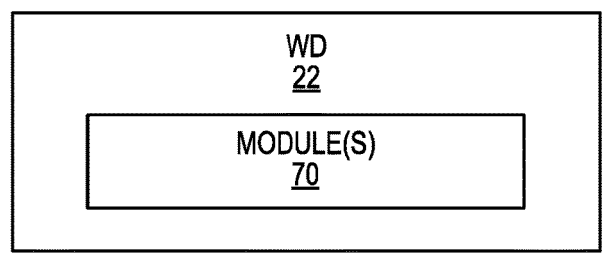

FIG. 25 is a schematic block diagram of the wireless device 22 according to some other embodiments of the present disclosure. The wireless device 22 includes one or more modules 70, each of which is implemented in software. The module(s) 70 provide the functionality of the wireless device 22 (e.g., UE) described herein.

Example Embodiments

While not being limited thereto, some example embodiments of the present disclosure are provided below.

In a first embodiment, a method of operation of a radio access node to enable broadcast operation and associated transmissions on an unlicensed carrier comprises performing a LBT procedure on a carrier in an unlicensed spectrum based on random backoff and a CW size prior to transmission of a PMCH burst and transmitting the PMCH burst if the LBT procedure determines that the carrier in the unlicensed spectrum is Idle.

In a second embodiment, the CW size is a fixed CW size.

In a third embodiment, the fixed CW size is defined based on any one or more of: the fixed CW size is set to a largest possible CW size used in Category 4 LBT for downlink PDSCH transmissions; the fixed CW size is set to a smallest possible CW size used in Category 4 LBT for downlink PDSCH transmissions; the fixed CW size is predefined; and the fixed CW size is determined based on one or more observed operation channel conditions.

In a fourth embodiment, a backoff counter for the LBT procedure is set to a deterministic value.

In a fifth embodiment, a backoff counter for the LBT procedure is determined based on reception of preambles from nodes of a same or different technology.

In a sixth embodiment, the CW size is an adaptive CW size.

In a seventh embodiment, the method of the sixth embodiment further comprises receiving feedback from a wireless device and adapting the adaptive CW size based on the feedback.

In an eighth embodiment, the feedback comprises a number of PMCH subframes successfully decoded by the wireless device in one or more previous PMCH transmission bursts.

In a ninth embodiment, receiving the feedback comprises receiving the feedback in a portion of a last slot of a last MBSFN subframe of a previous PMCH transmission burst.

In a tenth embodiment, the PMCH transmission burst comprises one or more PMCH transmissions, and at least one of the PMCH transmissions is limited to a portion of a respective MBSFN subframe.

In an eleventh embodiment, the portion of the respective MBSFN subframe is a first slot of the MBSFN subframe.

In a twelfth embodiment, the portion of the respective MBSFN subframe is a second slot of the MBSFN subframe.

In a thirteenth embodiment, a radio access node to enable broadcast operation and associated transmissions on an unlicensed carrier is provided, wherein the radio access node is adapted to perform a LBT procedure on a carrier in an unlicensed spectrum based on random backoff and a CW size prior to transmission of a PMCH burst and transmit the PMCH burst if the LBT procedure determines that the carrier in the unlicensed spectrum is Idle.

In a fourteenth embodiment, the radio access node is further adapted to operate according to the method of any of second through twelfth embodiments.

In a fifteenth embodiment, a radio access node to enable broadcast operation and associated transmissions on an unlicensed carrier is provided, wherein the radio access node comprises at least one transmitter, at least one processor, and memory storing instructions executable by the at least one processor whereby the radio access node is operable to: perform a LBT procedure on a carrier in an unlicensed spectrum based on random backoff and a CW size prior to transmission of a burst and transmit the PMCH burst if the LBT procedure determines that the carrier in the unlicensed spectrum is Idle.

In a sixteenth embodiment, a radio access node to enable broadcast operation and associated transmissions on an unlicensed carrier is provided, wherein the radio access node comprises: a LBT module operable to perform a LBT procedure on a carrier in an unlicensed spectrum based on random backoff and a CW size prior to transmission of a PMCH burst and a transmission module operable to transmit the PMCH burst if the LBT procedure determines that the carrier in the unlicensed spectrum is Idle.

In a seventeenth embodiment, a method of operation of a radio access node to enable broadcast operation and associated transmissions on an unlicensed carrier comprises performing a LBT procedure on a carrier in an unlicensed spectrum prior to transmission of MBMS data transmission that is to be synchronized with MBMS data transmissions from one or more other radio access nodes and, upon completing the LBT procedure, taking an action to ensure that the MBMS data transmission from the radio access node is synchronized with the MBMS data transmissions from the one or more other radio access nodes.

In an eighteenth embodiment, taking the action comprises, upon completing the LBT procedure after start of the MBMS data transmission from at least one of the one or more other radio access nodes, starting transmission of the MBMS data transmission such that the MBMS data transmission from the radio access node is synchronized to the MBMS data transmission from the at least one of the one or more other radio access nodes.

In a nineteenth embodiment, the method of the eighteenth embodiment further comprises performing a second LBT procedure in order to find another opportunity to transmit a portion of the MBMS data transmission that was not transmitted due to completing the LBT procedure after the start of the MBMS data transmission from the at least one of the one or more other radio access nodes.

In a twentieth embodiment, the method of the eighteenth embodiment is performed wherein the radio access node does not attempt to find another opportunity to transmit a portion of the MBMS data transmission that was not transmitted due to completing the LBT procedure after the start of the MBMS data transmission from the at least one of the one or more other radio access nodes.

In a twenty-first embodiment, the method of the seventeenth embodiment is performed wherein taking the action comprises, upon completing the LBT procedure before completion of respective LBT procedures by all of the one or more other radio access nodes, deferring a start of the MBMS data transmission from the radio access node until all of the one or more other radio access nodes have completed their respective LBT procedures such that the start of the MBMS data transmission from the radio access node is synchronized to a start of the MBMS data transmissions from the one or more other radio access nodes.

In a twenty-second embodiment, the method of the seventeenth embodiment is performed wherein taking the action comprises, upon completing the LBT procedure before completion of respective LBT procedures by all of the one or more other radio access nodes, broadcasting a preamble signal with a cell ID of the radio access node and one or more planned PMCH transmission burst parameters of the radio access node.

In a twenty-third embodiment, a radio access node to enable broadcast operation and associated transmissions on an unlicensed carrier is provided, wherein the radio access node is adapted to perform a LBT procedure on a carrier in an unlicensed spectrum prior to transmission of MBMS data transmission that is to be synchronized with MBMS data transmissions from one or more other radio access nodes and, upon completing the LBT procedure, take an action to ensure that the MBMS data transmission from the radio access node is synchronized with the MBMS data transmissions from the one or more other radio access nodes.

In a twenty-fourth embodiment, the radio access node of the twenty-third embodiment is further adapted to operate according to the method of any of the eighteenth through twenty-second embodiments.

In a twenty-fifth embodiment, a radio access node to enable broadcast operation and associated transmissions on an unlicensed carrier is provided, wherein the radio access node comprises at least one transmitter, at least one processor, and memory storing instructions executable by the at least one processor whereby the radio access node is operable to perform a LBT procedure on a carrier in an unlicensed spectrum prior to transmission of MBMS data transmission that is to be synchronized with MBMS data transmissions from one or more other radio access nodes and, upon completing the LBT procedure, take an action to ensure that the MBMS data transmission from the radio access node is synchronized with the MBMS data transmissions from the one or more other radio access nodes.

In a twenty-sixth embodiment, a radio access node to enable broadcast operation and associated transmissions on an unlicensed carrier is provided, wherein the radio access node comprises a LBT module operable to perform a LBT procedure on a carrier in an unlicensed spectrum prior to transmission of MBMS data transmission that is to be synchronized with MBMS data transmissions from one or more other radio access nodes, and an action taking module operable to, upon completing the LBT procedure, take an action to ensure that the MBMS data transmission from the radio access node is synchronized with the MBMS data transmissions from the one or more other radio access nodes.

In a twenty-seventh embodiment, a method of operation of a radio access node to enable broadcast operation and associated transmissions on an unlicensed carrier comprises transmitting DRS including SI, on a MBSFN subframe on a carrier in an unlicensed spectrum.

In a twenty-eighth embodiment, the carrier is a standalone MBMS carrier.

In a twenty-ninth embodiment, the DRS comprises PSS and SSS.

In a thirtieth embodiment, a radio access node to enable broadcast operation and associated transmissions on an unlicensed carrier is adapted to transmit DRS including SI on a MBSFN subframe on a carrier in an unlicensed spectrum.

In a thirty-first embodiment, the radio access node is further adapted to operate according to the method of any of the twenty-eighth to twenty-ninth embodiments.

In a thirty-second embodiment, a radio access node to enable broadcast operation and associated transmissions on an unlicensed carrier comprises at least one transmitter, at least one processor, and memory storing instructions executable by the at least one processor whereby the radio access node is operable to transmit DRS including SI on a MBSFN subframe on a carrier in an unlicensed spectrum.

In a thirty-third embodiment, a radio access node to enable broadcast operation and associated transmissions on an unlicensed carrier comprises a DRS transmitting module operable to transmit DRS, including SI, on a MBSFN subframe on a carrier in an unlicensed spectrum.

In a thirty-fourth embodiment, a method of operation of a radio access node to enable broadcast operation and associated transmissions on an unlicensed carrier comprises transmitting a plurality of PMCH bursts on a carrier in an unlicensed spectrum, wherein a PMCH burst number and a burst duration are associated with each PMCH burst of the plurality of PMCH bursts.

In a thirty-fifth embodiment, for each PMCH burst, the PMCH burst number and the burst duration for the PMCH burst are indicated at a beginning of the PMCH burst.

In a thirty-sixth embodiment, for each PMCH burst, the PMCH burst number and the burst duration for the PMCH burst are indicated at a beginning of the PMCH burst using C-PDCCH in a non-MBSFN region of a first subframe of the PMCH burst.

In a thirty-seventh embodiment, each PMCH burst comprises a plurality of MBSFN subframes that may be time-multiplexed with non-MBSFN subframes, and the PMCH burst comprises information indicating the locations of MBSFN subframes for the PMCH burst.

In a thirty-eighth embodiment, for each PMCH burst, the PMCH burst number and the burst duration for the PMCH burst are indicated in a preamble of the PMCH burst, wherein the preamble is enabled to be decoded by other radio access nodes.

In a thirty-ninth embodiment, a radio access node to enable broadcast operation and associated transmissions on an unlicensed carrier is adapted to transmit a plurality of PMCH bursts on a carrier in an unlicensed spectrum, wherein a PMCH burst number and a burst duration are associated with each PMCH burst of the plurality of PMCH bursts.

In a fortieth embodiment, the radio access node of the thirty-ninth embodiment is further adapted to operate according to the method of any of the thirty-fifth to thirty-eighth embodiments.

In a forty-first embodiment, a radio access node to enable broadcast operation and associated transmissions on an unlicensed carrier comprises at least one transmitter, at least one processor, and memory storing instructions executable by the at least one processor whereby the radio access node is operable to transmit a plurality of PMCH bursts on a carrier in an unlicensed spectrum, wherein a PMCH burst number and a burst duration are associated with each PMCH burst of the plurality of PMCH bursts.

In a forty-second embodiment, a radio access node to enable broadcast operation and associated transmissions on an unlicensed carrier comprises a PMCH burst transmitting module operable to transmit a plurality of PMCH bursts on a carrier in an unlicensed spectrum, wherein a PMCH burst number and a burst duration are associated with each PMCH burst of the plurality of PMCH bursts.

In a forty-third embodiment, a method of operation of a radio access node to enable broadcast operation and associated transmissions on an unlicensed carrier comprises transmitting a plurality of PMCH bursts on a plurality of carriers in an unlicensed spectrum based on respective LBT outcomes.

In a forty-fourth embodiment, a radio access node to enable broadcast operation and associated transmissions on an unlicensed carrier is adapted to transmit a plurality of PMCH bursts on a plurality of carriers in an unlicensed spectrum based on respective LBT outcomes.

In a forty-fifth embodiment, a radio access node to enable broadcast operation and associated transmissions on an unlicensed carrier, the radio access node comprises at least one transmitter, at least one processor, and memory storing instructions executable by the at least one processor whereby the radio access node is operable to transmit a plurality of PMCH bursts on a plurality of carriers in an unlicensed spectrum based on respective LBT outcomes.

In a forty-sixth embodiment, a radio access node to enable broadcast operation and associated transmissions on an unlicensed carrier comprises a PMCH burst transmitting module operable to transmit a plurality of PMCH bursts on a plurality of carriers in an unlicensed spectrum based on respective LBT outcomes.

The following acronyms are used throughout this disclosure.

μs Microsecond
3GPP Third Generation Partnership Project
5G Fifth Generation
ACK Acknowledgement
AP Access Point
ASIC Application Specific Integrated Circuit
BM-SC Broadcast-Multi-cast Service Centre
CA Carrier Aggregation
CC Component Carrier
CCA Clear Channel Assessment
CFI Control Format Indicator
CP Cyclic Prefix
C-PDCCH Common Physical Downlink Control Channel
CPU Central Processing Unit
CRC Cyclic Redundancy Check
C-RNTI Cell Radio Network Temporary Identifier
CRS Cell Specific Reference Symbol
CSMA/CA Carrier Sense Multiple Access with Collision Avoidance
CW Contention Window
DCF Distributed Coordination Function
DCI Downlink Control Information
DFT Discrete Fourier Transform
DIFS Distributed Coordination Function Inter-Frame Space
DMRS Demodulation Reference Signal
DRS Discovery Reference Signal
eLAA Enhanced License Assisted Access
eMBMS Enhanced Multimedia Broadcast/Multi-cast Services
eNB Enhanced or Evolved Node B
ePBCH Enhanced Physical Broadcast Channel
EPDCCH Enhanced Physical Downlink Control Channel
ePMCH Enhanced Physical Multi-cast Channel on Unlicensed Carriers
FDMA Frequency Division Multiple Access
FEC Forward Error Correction
FPGA Field Programmable Gate Array
GHz Gigahertz
HARQ Hybrid Automatic Repeat Request
ID Identity
kHz Kilohertz
LAA License Assisted Access
LAA-U License Assisted Access in the Unlicensed Spectrum
LBT Listen-Before-Talk
LTE Long Term Evolution
LTE-U Long Term Evolution in Unlicensed Spectrum
MBMS Multimedia Broadcast/Multi-cast Service
MBSFN Multi-cast Broadcast Single Frequency Network
MCCH Multi-cast Control Channel
MCS Modulation and Coding Scheme
MHz Megahertz
MME Mobility Management Entity
ms Millisecond
MTC Machine Type Communication
MTCH Multi-cast Traffic Channel
NACK Negative Acknowledgement
NR New Radio
OFDM Orthogonal Frequency Division Multiplexing
PBCH Physical Broadcast Channel
PCell Primary Cell
PCFICH Physical Control Format Indicator Channel
PDCCH Physical Downlink Control Channel
PDN Packet Data Network
PDSCH Physical Downlink Shared Channel
PDU Protocol Data Unit
P-GW Packet Data Network Gateway
PMCH Physical Multi-cast Channel
PRB Physical Resource Block
PSS Primary Synchronization Signal
PUCCH Physical Uplink Control Channel
PUSCH Physical Uplink Shared Channel
Rel Release
RRH Remote Radio Head
RS Reference Symbol
SCEF Service Capability Exposure Function SCell Secondary Cell
SC-FDMA Single Carrier Frequency Division Multiple Access
SFN System Frame Number
SI System Information
SIB System Information Block
SRS Sounding Reference Signal
SSS Secondary Synchronization Signal
TBS Transport Block Size
TDD Time Division Duplexing
TXOP Transmission Opportunity
UE User Equipment
UpPTS Uplink Part of the Special Subframe
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a radio access node to enable multi-cast transmissions on a carrier in an unlicensed spectrum, comprising:
   performing a Listen-Before-Talk, LBT, procedure on a carrier in an unlicensed spectrum based on random backoff and a contention window size prior to a multi-cast transmission; and
   transmitting the multi-cast transmission if the LBT procedure determines that the carrier in the unlicensed spectrum is Idle;
   wherein a backoff counter for the LBT procedure is determined based on reception of preambles from radio access nodes of a same or different technology.

2. The method of claim 1 wherein the contention window size is a fixed contention window size.

3. The method of claim 2 wherein the fixed contention window size is defined based on any one or more of:
   the fixed contention window size is set to a largest possible contention window size used in Category 4 LBT for downlink Physical Downlink Shared Channel, PDSCH, transmissions;
   the fixed contention window size is set to a smallest possible contention window size used in Category 4 LBT for downlink PDSCH transmissions;
   the fixed contention window size is predefined; and
   the fixed contention window size is determined based on one or more observed operation channel conditions.

4. The method of claim 1 wherein the backoff counter for the LBT procedure is set to a deterministic value.

5. The method of claim 1 wherein the contention window size is an adaptive contention window size.

6. The method of claim 5 further comprising:
   receiving feedback from a wireless device; and
   configuring the adaptive content window size based on the feedback.

7. The method of claim 6 wherein the feedback comprises a number of subframes successfully decoded by the wireless device in one or more previous multi-cast transmissions.

8. The method of claim 6 wherein receiving the feedback comprises receiving the feedback in a portion of a last slot of a last Multi-cast Broadcast Single Frequency Network, MBSFN, subframe of a previous multi-cast transmission.

9. The method of claim 1 wherein the multi-cast transmission comprises one or more multi-cast transmissions, and at least one of the multi-cast transmissions is limited to a portion of a respective MBSFN subframe.

10. The method of claim 9 wherein the portion of the respective MBSFN subframe is a first slot of the MBSFN subframe.

11. The method of claim 9 wherein the portion of the respective MBSFN subframe is a second slot of the MBSFN subframe.

12. The method of claim 1 wherein the multi-cast transmission is a Physical Multi-cast Channel, PMCH, burst.

\* \* \* \* \*